US010447730B2

(12) United States Patent
Gupta

(10) Patent No.: US 10,447,730 B2
(45) Date of Patent: Oct. 15, 2019

(54) DETECTION OF SQL INJECTION ATTACKS

(71) Applicant: Virsec Systems, Inc., Santa Clara, CA (US)

(72) Inventor: Satya Vrat Gupta, Dublin, CA (US)

(73) Assignee: VIRSEC SYSTEMS, INC., Santa Clara, CA (US)

( * ) Notice: Subject to any disclaimer, the term of this patent is extended or adjusted under 35 U.S.C. 154(b) by 222 days.

(21) Appl. No.: 15/153,691

(22) Filed: May 12, 2016

(65) Prior Publication Data
US 2016/0337400 A1 Nov. 17, 2016

Related U.S. Application Data

(60) Provisional application No. 62/162,621, filed on May 15, 2015, provisional application No. 62/286,282, filed on Jan. 22, 2016.

(51) Int. Cl.
*H04L 29/06* (2006.01)
*G06F 21/62* (2013.01)
(Continued)

(52) U.S. Cl.
CPC ...... *H04L 63/1466* (2013.01); *G06F 16/2455* (2019.01); *G06F 16/9017* (2019.01);
(Continued)

(58) Field of Classification Search
CPC .................................................. H04L 63/1466
See application file for complete search history.

(56) References Cited

U.S. PATENT DOCUMENTS 6,782,478 B1   8/2004   Probert
7,444,331 B1   10/2008  Nachenberg et al.
(Continued)

FOREIGN PATENT DOCUMENTS

EP         2023569 A1      2/2009
WO     WO 2016/186975 A1  11/2016

OTHER PUBLICATIONS

International Search Report and Written Opinion for PCT/US2016/032227 dated Sep. 21, 2016 entitled "Detection Of SQL Injection Attacks".

*Primary Examiner* — Kambiz Zand
*Assistant Examiner* — Thanh H Le
(74) *Attorney, Agent, or Firm* — Hamilton, Brook, Smith & Reynolds, P.C.

(57) ABSTRACT

In an example embodiment, a system detects unauthorized database queries made by a maliciously formed web request. The system captures a web request for a web application and one or more database queries triggered in response to the web request during runtime. If the captured web request matches a valid web request in a table of valid web requests for the web application, the system checks if each captured database query matches a valid database query mapped to the valid web request in the table. The system may declare an injection attack if at least one captured database query does not match a valid database query mapped to the valid web request, or may perform additional validation of the captured request and the at least one captured database query prior to declaring the attack. The system may form the table of valid web requests using a dynamic simulation process, using static code analysis, or a combination of both.

46 Claims, 15 Drawing Sheets

(51) Int. Cl.
*G06F 16/951* (2019.01)
*G06F 16/2455* (2019.01)
*G06F 16/901* (2019.01)
*G06F 21/55* (2013.01)
*G06F 21/57* (2013.01)

(52) U.S. Cl.
CPC .......... *G06F 16/951* (2019.01); *G06F 21/552* (2013.01); *G06F 21/554* (2013.01); *G06F 21/577* (2013.01); *G06F 21/6218* (2013.01); *H04L 63/02* (2013.01); *H04L 63/14* (2013.01); *H04L 63/1408* (2013.01); *H04L 63/1416* (2013.01); *H04L 63/1425* (2013.01); *H04L 63/1433* (2013.01); *H04L 63/168* (2013.01)

(56) References Cited

U.S. PATENT DOCUMENTS

| | | |
|---|---|---|
| 8,958,546 B2 | 2/2015 | Probert |
| 9,230,455 B2 | 1/2016 | Probert |
| 2006/0242709 A1* | 10/2006 | Seinfeld ................ G06F 21/56 726/24 |
| 2007/0078829 A1* | 4/2007 | Stern ................ G06F 17/30938 |
| 2007/0136312 A1 | 6/2007 | Shulman et al. |
| 2009/0144827 A1* | 6/2009 | Peinado ................ G06F 21/577 726/25 |
| 2012/0117644 A1* | 5/2012 | Soeder ................ G06F 21/554 726/22 |
| 2014/0108803 A1 | 4/2014 | Probert |
| 2014/0337639 A1 | 11/2014 | Probert |
| 2016/0094349 A1 | 3/2016 | Probert |

* cited by examiner

| ID | 502 Non SQL Producing Method/ URL | 504 SQL Producing Method/ URL | 506 SQL Golden Copy | 508 Expression count check | 510 Preliminary Status | 512 Additional False Positive Mitigation Check | 514 Result of Additional Mitigation Check | 516 Final Result |
|---|---|---|---|---|---|---|---|---|
| 1 | OK | | No SQL | | Normal Scenario | | | Normal Scenario |
| 2 | | OK | OK | OK | Normal Scenario | | | Normal Scenario |
| 3 | | OK | OK | Not OK | Attack | | | Attack |
| 4 | | OK | Not OK | | Potential Threat, HALT thread and invoke additional check | Run GET/POST with simulated values and obtain SQL on the fly and compare Expression count with real time SQL expression count | Fail; Send Event Chain to Attack State | Attack |
| | | | | | | | Pass; Resume thread | FPM to Push new SQL into Golden SQL REGEX file |
| 5 | Not OK | | No SQL | | Normal Scenario | | | FPM to Push new URL into Golden URL REGEX file |
| 6 | Not OK | | Unrecognized SQL Found | | Potential Threat, HALT thread and invoke additional check | Run GET/POST with simulated values and obtain SQL on the fly and compare Expression count with real time SQL expression count | Pass; Resume Thread | FPM to Push new SQL and URL into Golden SQL URL REGEX file |
| | | | | | | | Fail; Send Event Chain to Attack State | Attack* |
| 7 | Not OK | | OK | Not OK | Attack | | | Attack |
| 8 | Not OK | | OK | OK | | | | FPM to Push new URL into Golden URL REGEX file |

FIG. 5A

| File 1 - URL/Method Golden List | | | |
|---|---|---|---|
| URL_ID | URL_STRING | URL_TYPE | NOTE |
| 1 | GET/magento/index.php/HTTP/1.1 | 0 | Non-SQL Producing URL |
| 2 | GET/magento/catalog/cataloglist.php/HTTP/1.1 | 1 | SQL Producing URL |
| 3 | GET/magento/account/account/accountsettings.php/HTTP/1.1 | 1 | SQL Producing URL |

| File 2 - URL/Method Golden List with WILDCARD(s) | | | | |
|---|---|---|---|---|
| URL_ID | URL_STRING | URL_TYPE | WC_LENGTH | NOTE |
| 1 | GET/magento/index.php/customer/acount/login HTTP/1.1?userid=*&locid=*&pre code=* | 1 | WC1-63, WC2-7, WC3-10 | URL_TYPE -> SQL Producing URL |
| 2 | GET/magento/index.php/customer/acount/logout HTTP/1.1?userid=* | 1 | WC1-66 | URL_TYPE -> SQL Producing URL |

FROM FIG. 5B-I

File 3 - SQL/SPC Golden List with Expression count

| SQL_ID | SQL_STRING | SQL_TYPE | Expression count | NOTE |
|---|---|---|---|---|
| 1 | SELECT 'main_table','*'FROM 'design_change 'AS'main_table'WHERE(store_id='*') AND(data_from IS NULL) AND (data_to >= '*' or data_to IS NULL | 0 | 6 | SQL_TYPE -> 0 SQL Statement, 1 Stored Procedure, 3 Function |
| 2 | SELECT 'user_id', 'name', 'tel'FROM 'UserInfo'WHERE'user_id ='*' | 0 | 4 | |
| 3 | get_product_info('*',,') | 1 | 0 | |
| 3 | get_product_catalog_map(*) | 1 | 0 | |

File 4 - SQL/SPC Golden List with WILDCARD length

| SQL_ID | SQL_STRING | SQL_TYPE | WC LENGTH | NOTE |
|---|---|---|---|---|
| 1 | SELECT 'main_table','*'FROM 'design_change 'AS'main_table'WHERE(store_id='*') AND(data_from <= '*' or data_from IS NULL) AND (data_to >= '*' or data_to IS NULL | 0 | WC1=79, WC2=22, WC3=41, WC3=21 | SQL_TYPE -> 0 SQL Statement, 1 Stored Procedure, 3 Function |
| 2 | SELECT 'user_id', 'name', 'tel'FROM 'UserInfo'WHERE'user_id ='*' | 0 | WC1=67 | |
| 3 | get_product_info('*',,') | 1 | WC1=17, WC2=2, WC3=1, WC4=1 | |
| 3 | get_product_catalog_map(*) | 1 | WC1=24, WC2=1 | |

FIG. 5B-II

DETECTION OF SQL INJECTION ATTACKS

RELATED APPLICATION

This application claims the benefit of U.S. Provisional Application No. 62/162,621, filed on May 15, 2015, and U.S. Provisional Application No. 62/286,282, filed on Jan. 22, 2016. The entire teachings of the above applications are incorporated herein by reference in their entirety.

BACKGROUND

With each passing day, cyber-attacks are becoming increasingly sophisticated. Attacks, such as SQL Injection Attacks, are targeted to exploit specific vulnerabilities in specific applications. The cause and effects of such attacks are not discernible at the network layer because these attacks extend beyond the most simplistic attacks and do not trigger network activity that can be construed as overtly malicious. Enterprise databases are preferred targets for attackers since highly valuable information, such as credit card numbers, customer social security numbers, health records, other personally identifiable information, detailed customer lists, design plans, source code, and other intellectual property resides in these databases. In order to deal with these targeted attacks, many vendors have deployed cyber security products, such as next generation firewalls and web application firewalls which attempt to tie user access and behavior to markers in the application, or sandboxing technologies which attempt to run what the vendors consider to be suspicious code, in a sandbox and wait for such code to perform observable malicious activities. To cope with such detection mechanisms, malware often adapts its behavior, such as waiting for the detection engine to give up looking before the malware unleashes its malicious intent. These changes in behavior hamper the contemporary cyber security solution's ability to recognize the behavior of the attack and, therefore, their ability to detect the presence of malware in a timely fashion.

SUMMARY

A very large number of malware attacks of computer applications today result from the ability of a malicious actor to inject and later execute malicious content unbeknownst to information technology (IT) of an organization. The process of injecting such malicious content involves identifying and exploiting poorly designed code that performs inadequate input validation. The current cyber security technologies either attempt to observe malicious content in the network traffic, or trace the network behavior of the application and hope the network behavior exhibits some previously catalogued abnormal activity, or screen the behavior of suspicious code in a sandbox before dispatching it to a server for execution. These technologies do not have the capability to examine computer applications in real-time at a low enough granularity in process memory to reliably detect root cause triggers that precedes the execution of such malicious content. In addition, the current generation of security technologies does not have the capability to maintain state which means they cannot track and correlate such events over extended periods of time in order to accurately identify malware attacks before the malware successfully carries out its malicious intent.

In an attack, such as an SQL injection attack, on one or more enterprise databases, the malicious actor may generate a web request (triggered by either a user or by a web service), such as a Uniform Resource Locator (URL), and cleverly append database query language (e.g., SQL) expressions/keywords into the data parameters of the request. The web application processing the request may not recognize the addition of these expressions/keys in the data parameters, and, may insert such user data (including the maliciously introduced expressions/keywords) into database queries generated as part of its internal pre-processing. The additional expressions/keywords in the queries may alter the nature of the query, so as to reveal confidential information to the attacker.

The present disclosure is directed to systems and methods that detect unauthorized database queries by a maliciously formed web request as part of an injection attack. The systems and methods capture a web request for a web application and one or more database queries triggered in response to the web request during runtime. The systems and methods then check if the captured web request matches a valid web request in a table of valid web requests for the web application. In some embodiments, the web request may comprise a path to a Uniform Resource Identifier (URI) or Uniform Path Locator (URL). If the captured web request matches a valid web request, the systems and methods next check if each captured database query matches a valid database query mapped to the valid web request in the table. In some embodiments, correlated user, session, and context information is used to determine at least one of: (i) whether the captured web request matches a valid web request in a table and (ii) whether each captured database query matches a valid database query. The systems and methods declare an injection attack if at least one captured database query does not match a valid database query mapped to the valid web request. In some embodiments, the systems and methods declaring the injection attack further comprise performing at least one remediation action, including terminating a respective web session and informing security operations personnel, wherein the remediation action is carried out automatically by the methods or systems or by an asynchronous operation triggered by the security operations personnel. In some embodiments, the systems include an analysis engine for capturing and checking the request and database queries. In such a case, the analysis engine sends an attack status to a validation engine, which may further correlate the attack status with other application status, to declare the injection attack and, in some embodiments, perform the remediation actions.

In some embodiments, the systems and methods form the table of valid web requests mapped to corresponding database queries, which may be referred to as a golden table containing golden references for all application behavior. In some of these embodiments, the systems and methods may also form the table dynamically. In these embodiments, the systems and methods may first extract one or more methods contained in a directory structure for the web application (e.g., HTML or CSS generated web pages of the application). The extraction may be performed by a crawler or spider application, and the files of the directory structure may be of scripting languages including PHP, .NET, HTML, CGI, Fast CGI, Python, Ruby, Java, or a combination of these and other such scripting languages used for web applications. Then, for each given method of the extracted one or more methods, the systems and methods may identify valid data types for one or more expression parameters of the given method. The systems and methods may next form one or more valid web requests from the given method, wherein each valid web request is formed with a different permutation of the valid data types for the one or more expression parameters of the given method. The systems and methods may next simulate the given web request to capture one or more database queries triggered in response to the given web request. The systems and methods may store in the formed table, the given web request mapped to the one or more captured database queries.

In some of these embodiments, the systems and methods may form the table statically. In these embodiments, the systems and methods may first extract one or more methods contained in a directory structure for the web application. The extraction may be performed by a directory traversal or crawler application, and the files of the directory structure may be of scripting languages including PHP, HTML, CGI, Python, Ruby, Java, or a combination of these scripting languages and other such scripting languages used for web applications. Then, for each given method of the extracted one or more methods, the systems and methods may identifying valid data types for one or more expression parameters of the given method. The systems and methods may next disassemble one or more files of the directory structure that process the given web request. The systems and methods may use code analysis to parse the disassembled files to determine each database query triggered in response to the given web request. The systems and methods may then store in the formed table, the given web request mapped to the determined database queries triggered in response to the given web request. In some embodiments, dynamic fuzzy techniques are used to extract relationships between an URI and corresponding database queries to store in the formed table. In some embodiments, the systems and methods may also determine the web request using code analysis in the same manner as used for determining each database query. In some embodiments, the systems include an instrumentation engine that forms the table using the dynamic method, the static method, or by a combination of both methods. The table may be formed at load time or runtime using these methods.

In some embodiments, the systems and methods may confirm whether the at least one captured database query is a valid query in response to the corresponding request prior to declaring the injection attack. The systems and methods may check expression parameters contained in the captured web request, and declare the attack if at least one checked expression parameter contains (i) data of an incorrect data type, or (ii) a database expression or keyword. The systems and methods may also check at least one of the length or the format of at least one section of the captured web request or response, and declare the injection attack if the checked length or format is incorrect for at least one section. The systems and methods may further check the number of expressions in the at least one captured database query, and declare the injection attack if the checked number of expressions is incorrect for the at least one captured database query. The systems and methods may check the structure of the at least one captured database query, and declare the injection attack if the checked structure is invalid for the at least one captured database query. The systems and methods may also check the output of the at least one captured database query, and declare the injection attack if the output is invalid for the at least one captured database query. If the at least one captured database query is determined to be valid based on these checks, the systems and methods may add the at least one captured database query mapped to the corresponding valid web request in the formed table.

In some embodiments, the systems and methods may check the validity of a database query by capturing database information from a database server. The systems and methods may extract database query information for one or more database queries from the database information at an application server. The systems and methods may further insert the extracted database query information at the application server into context data sent to one or more threads of a web server. The systems and methods may then correlate, at the web server, user, session, URI, success/failure flag, and context information to the database query information in the context data. In some embodiments, the correlating determines a user that generated the captured web request that triggered a respective database query. Some of the systems may use the analysis engine or instrumentation engine to perform the capturing, extracting, inserting, and correlating of the database query information. The system and method may declare the injection attack if at least one database query is unauthorized based on the correlated user, session, URI, success/failure flag, and context information. Some of the systems may use the validation engine to declare the injection attack based on the correlated user, session, and context information.

In some embodiments, if the captured web request is determined to not match a valid web request in the table, the systems and methods may determine if the request actually represents a valid request for the web application. This may be performed by comparing the request to one or more methods contained in the directory structure of the application for processing requests. If the request is determined to be a valid web request, the systems and methods may simulate the web request to capture one or more database queries triggered in response to the request. The simulation of the web request may be in real-time. The systems and methods may then store the web request mapped to the one or more captured database queries.

In some embodiments, the web request may be an URL, and in some of these embodiments, the URL may be contained in a HTTP Request. In example embodiments, the database query may be a SQL query and the injection attack may be a SQL injection attack. In embodiments, the systems and methods capture web requests by instrumenting instructions in the web server or application server at load time. The instrumentation engine may install and monitor the instrumented instructions on the web server or the application server.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present disclosure.

FIG. 5A illustrates an example chart of methods used to detects attacks in embodiments of the present disclosure.

FIG. 5B illustrates example regular expression files use to detect attacks in embodiments of the present disclosure.

DETAILED DESCRIPTION

A description of example embodiments of the disclosure follows.

The teachings of all patents, published applications and references cited herein are incorporated by reference in their entirety.

Malware Attack Vulnerability Categories

The National Vulnerability Database (NVD) enumerated approximately 4100 application vulnerabilities in 2011 and approximately 5300 application vulnerabilities in 2012, which are divided into twenty-three attack categories. While a few of the attack categories involve attacks resulting from negligence or misconfiguration, the largest number of attack categories involve a malicious actor purposely injecting, and later causing execution of, malicious content in an executing process. The process of injecting such malicious content involves identifying and exploiting some poorly designed code that performs inadequate input validation. For example, if the code lacks in size related validation, the code may allow buffer error style attacks included in the Buffer Errors attack category. In another example, if the code lacks in content related validation, the code may allow insertion of scripts or insertion of SQL expressions/keywords into database queries, as in the Cross Site Scripting attack category and SQL Injection attack category, respectively.

Example Malware Attacks

Figure 1:
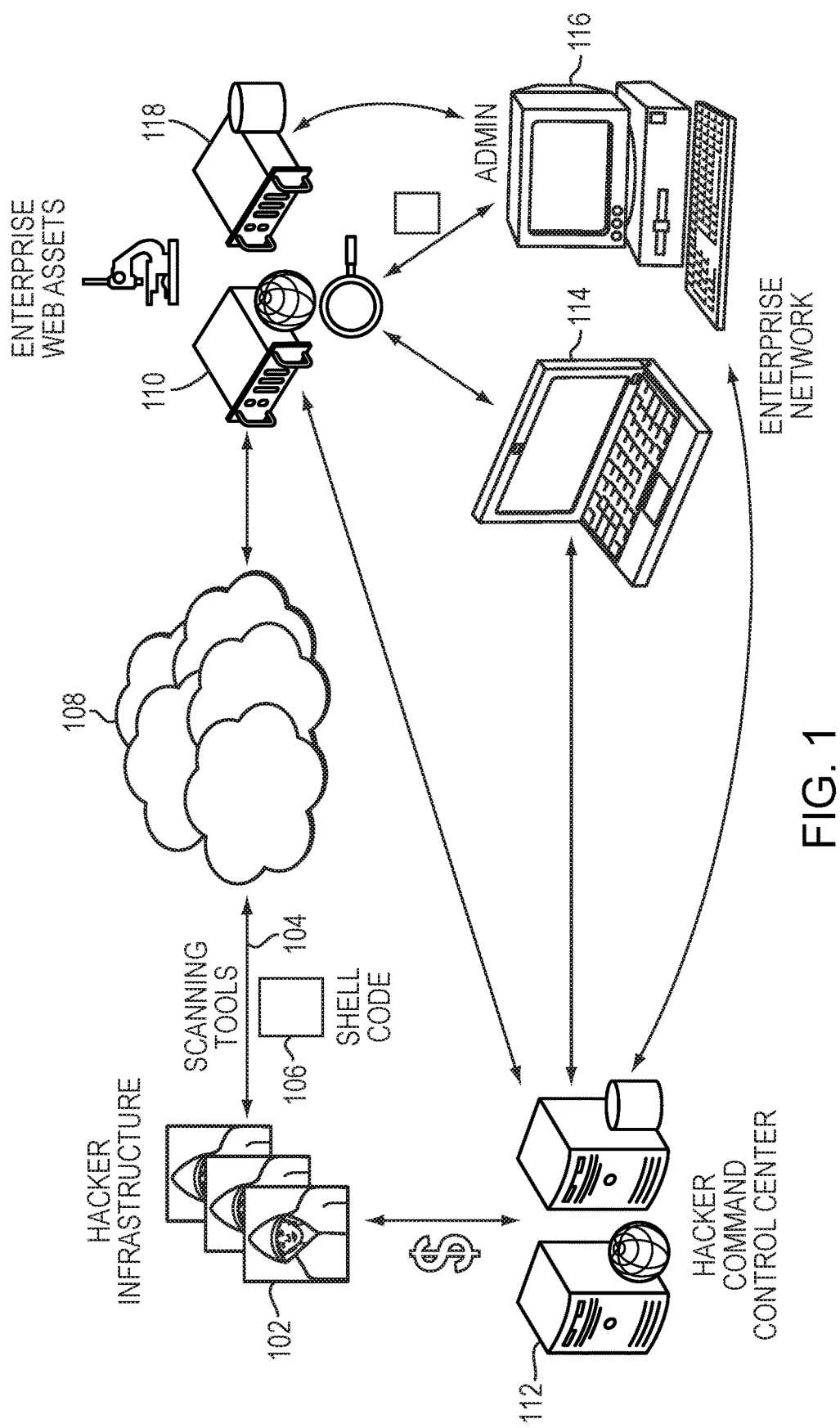
FIG. 1 illustrates an example configuration of an advanced persistent malware attack.

FIG. 1 illustrates an example of an advance persistent malware attack. In this scenario, a malicious actor (or hacker) from the actor's own infrastructure 102 remotely scans the web facing the infrastructure of an enterprise 108 using scanning tools such as nmap 104. When the scan finds a server that has either a known vulnerability or zero-day vulnerability, the actor installs shell code 106 to gain control of the remote enterprise server (i.e., target) 110 and access the enterprise network. Once inside the network, the malicious actor loads additional tools. These tools may include nmap, port scanners, password cracking tools, ftp client, compression tools, hashing, and/or encryption and decryption tools.

The actor then accesses the enterprise infrastructure looking for a machine 114 or 116 from which elevated privileged users log into valuable targets, such as databases and file repositories. The actor is looking for the machine 114 or 116 for the purposes of scraping the access credentials of the user and for finding a home for more hacking tools. Upon finding a machine with vulnerable applications 114 or 116, the malicious actor can scrape for credentials, infiltrate and subsequently access the target 110. Once the target is accessed, additional tools of the trade are loaded onto the target 110. Malware can also be deposited onto mobile devices such as smartphones and laptops of privileged users as they take their machines through unprotected networks such as coffee shops, airports, and hotels. In another scenario, an inside user may infect the target machines with viruses or other malware attacks. By using sophisticated password cracking tools or snooping intranet traffic, the malware can obtain the credentials of the administrative user 116.

Enterprise databases are preferred targets for malicious actors since highly valuable information may be access by a privileged user. For example, in these databases, a privileged user has access to large chunks of confidential customer information regarding many users, while a regular user only has access to parts of the confidential information pertinent to themselves. After credentials have been obtained, the malicious actor can connect to the databases and file repositories 118 as a privileged user and extract the valuable confidential information, such as real names, home addresses, social security, driver licenses, birth dates, medical records, financial information such as credit/debit card numbers, phone numbers, email addresses, user names and passwords, insurance information, detailed customer lists, design plans, and source code or other intellectual property.

The malicious actor can optionally compress and encrypt this information and upload it to the Hacker Command Control Center 112 in small chunks so as to not draw attention of the enterprise security analysts. To achieve this objective, the malicious actor may change the IP addresses of the Hacker Command Control Center 112 on a daily basis or use proxies so that intrusion detection systems in the enterprise cannot establish a pattern. An enterprise typically sends and receives over 10 GB of data every day; therefore uploading relatively small amounts of data in short bursts often goes unnoticed.

In another scenario, the malicious actor may use a database query injection attack, such as a SQL injection attack, to extract valuable confidential information regarding enterprise clients or customers. In the SQL injection attack, the malicious actor appends database query expressions/keywords into a web request (e.g., URL) for a web application. When the application processes the web request, the application inadvertently inserts the expressions/keywords into database queries generated as part of processing the request. These additional expressions/keywords in the database queries may substantially manipulate the nature and intent of the queries, such that database records for many customers are queried rather than for one particular customer-user. Once the altered SQL Query is executed, confidential information regarding many customers may be revealed to the malicious actor. Further, in the same manner, a malicious actor can leverage a Remote File Injection (RFI) attack to insert additional functionality into a web facing application. Such functionality can be accessed by the malicious actor using completely benign user input, but when the injected functionality is executed, it may unintentionally reveal confidential information to the malicious actor.

SQL injection attacks succeed because without having a deep understanding of the application, a cyber-security solution cannot determine if a malicious actor has inserted additional expressions into an SQL query. Cyber-security solutions, such as web application firewalls and intrusion detection/prevention engines, may only detect SQL keywords in web requests. These solutions cannot detect the insertion of SQL expressions since the combination of database object names and the plethora of conditional operators used in expressions may be numerous and indistinguishable from genuine user input. Without detecting the insertion of SQL expressions, these cyber-security solutions cannot detect the majority of SQL injection attacks by malicious actors.

Web Application Infrastructure

Figure 2:
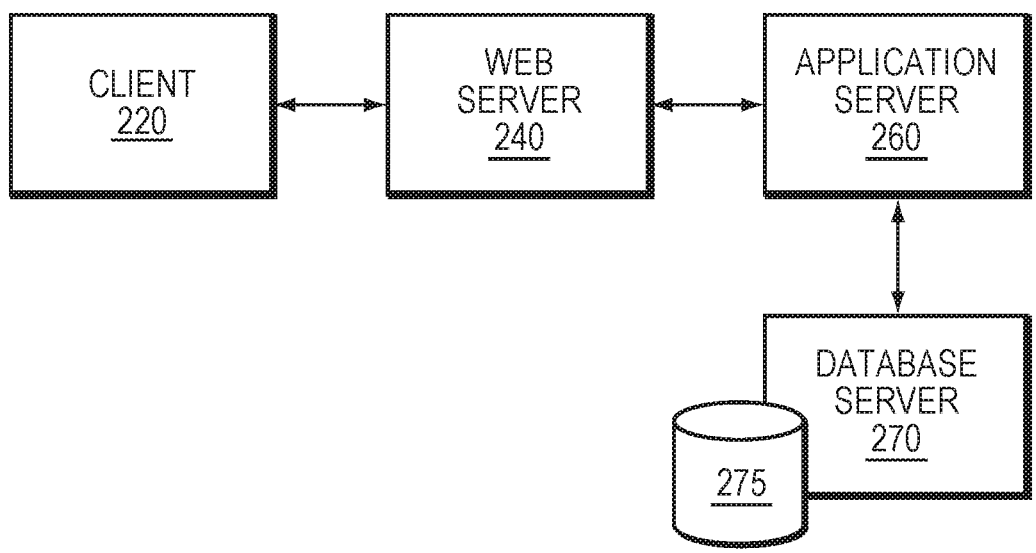
FIG. 2 illustrates an example web application infrastructure in embodiments of the present disclosure.

FIG. 2 illustrates an example web application infrastructure that may be vulnerable to database injection attacks, such as a SQL injection attack. The system includes a remote web client 220 from which a user or application many generate a web request for performing a transaction. The user many generate the web request by entering an URL in a web browser, or selecting a webpage icon which enters the URL for the user. The web client 220 may send the web request (e.g., in the format of a HTTP Request containing the URL) to the web server 240, which may in turn send the request to the application server 260 for further processing. The web server 240 or application server 260 may include a directory structure of files containing methods corresponding to specific URL requests that can be made by the user. The application server 260 may process the request using these methods, and as part of processing, the methods may produce database queries. These queries may be communicated to the database server 270 to retrieve records from the web application database 275 related to the web request. Some of the data from the records may be returned to the user in a web response (e.g., HTTP Response) as part of the transaction.

Matching Database Access Activities to a User

The web application infrastructure of FIG. 2 may be further utilized to dynamically correlate database access activities to a particular user in embodiments of the present disclosure. Specifically, using information included in a received web request (e.g., URL) from a web client 220, the web server 240 may authenticate the user 220 submitting the web request from the web client 220. If the authentication is successful, the web server 240 establishes a connection (or session) for the user (via the web service client 220) to access data within the web application infrastructure of FIG. 2. The web server 240 maintains user, session, and context data to exchange web requests and web responses with the user (via the web service client 220) within the session. During the session, the web server 240 processes web requests by communicating with the application server 260 of the web application infrastructure via inter-dependent mechanisms that utilize Cross-Context containers and local/inter process communications (LPC/IPC). In other embodiments, the communication between the web server 240 and the application server 260 may be exchanged using any other context data memory structures and any other process communication methods. Note, the context data may be any data structure used to transmit data between servers or other such equipment, including any data structures used in .NET, JAVA, PHP, Ruby, Python, CGI, Fast CGI, or any other interpretive language without limitation.

The Cross-Context containers (context data) comprise multiple pieces of memory (data objects), including HTTP/Synchronization, Call/Operations, and such, used to hold data shared between the web server 240 and the application server 260. These data objects may be formatted as internal data structures or text based memory elements (e.g., in XML, JSON, raw data format). An analysis engine, such as an application runtime monitoring and analysis (ARMAS) Appliance, communicates with the web server 240 and application server 260 to instrument code to extend the context data in accordance with respective data structures shown in Appendix A. That is, the analysis engine communicates with an instrumentation engine (comprising the instrumented code) configured at the web server 240 and application server 260 to extend the context data. For example, the instrumentation engine retrieves user, session, context, and user input information from the web request received at the web server 240, including user name (e.g., uuid), IP address, port number, URL, session id, HTTP data, and any other such user/session information.

The instrumentation engine then inserts the user, session, and context information, along with information related to the web server and application server processing, such as PID, thread id, application name, into the data structures of Appendix A (e.g., the VS_HTTP_REQ data structure), which are added as an extension to the context data. For another example, the instrumentation engine also inserts the user and session information received in extended context data from the web server 240 into web responses returned to the web server 240 from the application server 260, such as shown in the VS_HTTP_RESP data structure of Appendix A. For further example, the instrumentation engine may insert extracted database information from the database server 270 into web responses returned to the web server 240 from the application server 260, such as shown in the VS_JAVA_AS_SQL data structure of Appendix A. In other embodiments, the extended context data may comprise any other data structure without limitation. In some embodiments, the .NET CallContext.SetData method may be used to set the extended data structure into the context data. In other embodiments, methods from any other interpreter may be used to set the extended data structure, including Java, PHP, Ruby, or such.

The web server 240 or application server 260 may invoke either the LPC or the IPC channel (using shared memory or sockets when both the web server 240 and application server 260 are running on the same hardware), or IPC channel (using sockets or pipes when the web server 240 and application server 260 are running on different channel) to exchange the context data between the web server 240 and application server 260. When the LPC or IPC channel is invoked, the channel transports the context data, including the respective extended data structures of Appendix A as out of band data. By sharing information between threads/processes using the LPC or IPC channels, user, session, context, or any information uniquely associated with a web server 240 or application server 260 state can be passed between the web server 240 and the application server 260 without changing the communications interface between the web server 240 and the application server 260 (in either direction). Further, the use of the unique context data (and LPC/IPC) enables the instrumentation engine access to the communications between the web server 240 and the application server 260 for the span of the sessions (until the session is destroyed).

In this way, the instrumentation engine may insert user, session, and context information (including URI information) for a given web service request/response into the extended data structure, along with information related to one or more database activities (or other web service activities) triggered with respect to the given web service request/ response. Specifically, the instrumentation engine may capture database information from the database server 270. The instrumentation engine may then, at the application server 260, extract database query information for one or more database queries from the database information and insert the extracted database query information (including success/ failure flags) into context data sent to one or more threads of the web server 240. The user, session, URL, database query, and other context data inserted into the extended data structure may then be extracted to be used to correlate the respective database queries to a particular user, user data, and session at the web server 240. Then, the information of the respective database queries (or other database activities) correlated/matched to a particular user, user data, context, URL, and session may be sent to an analysis engine (or security monitoring agent in other example embodiments) to check for a potential database injection attack (e.g., SQL injection attack). Note, this information specifically pin points which user generated the web request that triggered each database query. The instrumentation engine may send some or all of the captured database query data to the analysis engine. Specifically, the analysis engine may use the matched information (together with a generated golden table or AppMap table) to perform deep context aware searches for detecting a database injection attack, if the database activities (e.g., database queries) are unauthorized based on the correlated user and session information.

For example, if the database activities comprise a database request querying tables of the database 275, the analysis engine may match the user and session information to corresponding information specified in the query to determine if the query is consistent with the user/session (e.g., not querying data respective to another user/session, not querying data of a higher privilege level, and such) to determine its validity. Similarly, if the database activities comprise a database response with accessed data from the database, the analysis engine may match the user, session, URI, and context information to corresponding information specified in the accessed data to determine if the access data is consistent with the user/session (e.g., not accessing data respective to another user/session, not accessing data of higher privilege level, and such) to determine its validity. For another example, if the golden table or AppMap table indicates that a particular web service request/response or database request/response requires different data parameters (e.g., data type, expression count, and such) based on user or session specific parameters (e.g., user/session privilege level), then the user/session data may be used, together with the golden table or AppMap, to determine the validity of the data parameters in the particular request/response. Based on the determined, the analysis engine may communicate with a validation engine to detect that the web service request constitutes a database injection attack.

Detection Process

Figure 3A:
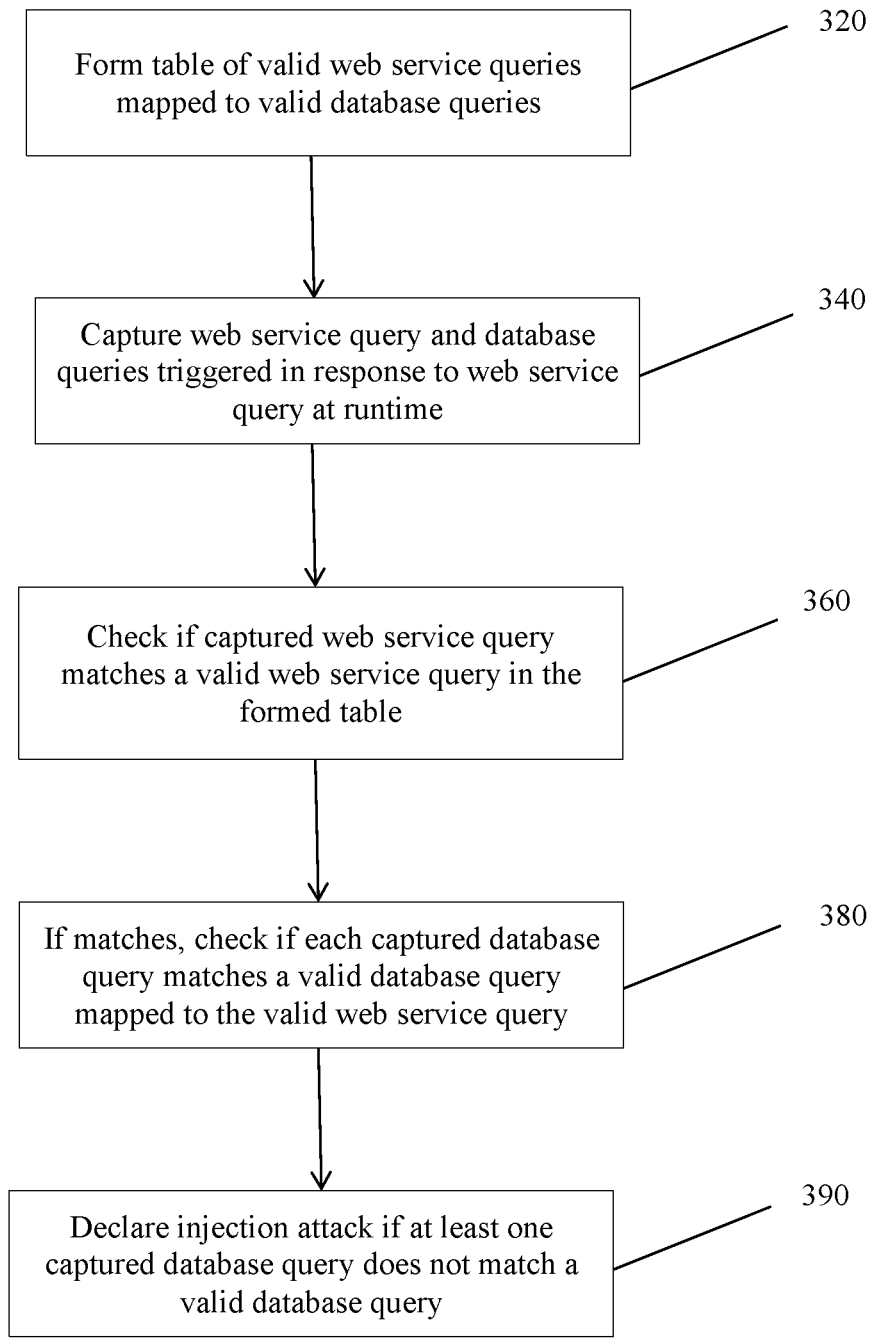
FIG. 3A illustrates a flowchart depicting an example method of detecting injection attacks in embodiments of the present disclosure.

FIG. 3A illustrates a flowchart depicting an example method of detecting (and preventing) injection attacks in embodiments of the present disclosure. At step 320 a security monitoring agent forms a table of valid web requests for a web application, referred to as a golden table (also referred to as the AppMap table). In some embodiments, the web requests may be HTTP Requests, and in some of these embodiments the HTTP Request (e.g., in form fields) may contain URLs. In the table, referred to as a golden table or AppMap table, the client maps each valid web request to the valid database queries that the application may trigger in response to the web request. For example, the golden table may map well-known URLs to specific queries performed by the application. In some embodiments, the database queries may be SQL queries, and in other embodiments, the database queries may be in another query language. In some embodiments, the security monitoring agent may form the golden table at load time, and in other embodiments, the security monitoring agent may form the golden table at runtime. In some embodiments, the formed table may be updated at runtime with additional valid web requests and additional valid database queries mapped to the requests. The security monitoring agent forms the golden table to prepare for detecting and preventing injection attacks that trigger invalid database queries.

The security monitoring agent may form the golden table by communicating with an instrumentation engine configured on the web server 240 or the application server 260 executing the web application. The instrumentation engine installs and monitors instrumented code on the web server 240 or the application server 260 for detecting injection attacks. In some embodiments, the instrumentation engine may be configured remotely from the web server 240 or application server 260 executing the web application, but still communicatively coupled to the web server 240 or application server 260. In some embodiments, the security monitoring agent may request that the instrumentation engine use a dynamic process, also referred to as a dynamic fuzz analysis, for forming the golden table. In other embodiments, the security monitoring agent may request that the instrumentation engine uses a static process, also referred to as code analysis (e.g., SQL code analysis) or de-compiling/ disassembling, for forming the golden table. In yet other embodiments, the security monitoring agent may request that the instrumentation engine use a combination of the dynamic and static processes for forming the golden table.

In the embodiment of FIG. 3A, to form the golden table (also referred to as AppMap table) using the dynamic or static process, the instrumentation engine must first determine the valid web requests for the web application. The instrumentation engine may determine the valid requests by extracting the one or more methods used by the application for processing the requests, or parameters used in the URL. In each extracted method, the instrumentation engine must also identify the valid data types of the expression parameters for each method. The instrumentation engine may analyze database tables retrieved from the web application database 275, by communication with the database server 270, to determine the valid data types for each expression parameter. In some embodiments, the instrumentation engine may also analyze context data that maps extracted database queries from a database server to user, session, and context information related to the web service request (e.g., at a web server, application server, and such) to determine valid data types for each expression parameter. In example embodiments, using the extracted methods and corresponding data types for the expression parameters, the instrumentation engine may form the web requests for the web application. For each method, the instrumentation engine may form one or more web requests by using different permutations of the valid data types for the expression parameters of the method. Then, in the dynamic process, the instrumentation engine may simulate (i.e., fire) each of the formed web request with contextually appropriate user and form data, and capture the database queries triggered by the application. In the static process, the instrumentation engine may use code analysis to decrypt and disassemble the methods for each request and parse from the decrypted/ disassembled code the database queries that are produced from the request. In the static process, the instrumentation engine may also use dynamic fuzzing techniques to extract the relationship between the URI and the corresponding database queries. In both processes, the instrumentation engine stores a mapping of the web request to the database queries in the golden table in a database on the security monitoring agent, and then copies the golden table to a database on the analysis engine. The instrumentation engine may also parse the requests and database queries into regular expressions for matching against network traffic. The regular expressions may be written to regular expression files which are also stored in the golden table, or in another memory location, on the analysis engine.

Once a golden table is present at the analysis engine, at step 340, web requests, and corresponding database entries, may be captured from network traffic received in the web application infrastructure. In some embodiments, the analysis engine may capture the requests and database queries, and in other embodiments the instrumentation engine may capture the requests and database queries. The instrumentation engine or analysis engine may capture the request by instrumenting strategic code, such as the HTTP Event pipeline, to detect and intercept traffic at the web server or application server or monitoring specific APIs at the web server or application server. The instrumentation engine or analysis engine checks each captured web request at step 360 to determine if it matches a valid web request when cross correlated against the golden table. If the captured web request does not match a valid web request in the golden table, the instrumentation engine may perform validation to determine if the captured request actually represents a valid request for the web application. If the analysis engine made the determination, then it may request the instrumentation engine to perform the validation. The instrumentation engine may compare the request to the methods contained in a directory structure of the application, and if the request is determined to be a valid request, the instrumentation engine may simulate the request to capture database queries triggered in response to the request. The instrumentation engine may add the mapping of the web request to the captured database queries in the golden table in the golden table in a database on the security monitoring agent, and then copies the golden table to a database on the analysis engine. The instrumentation engine may also parse the request and database queries into regular expressions for matching against network traffic. The regular expressions may be added to the regular expression files which are stored in the golden table, or in another memory location, on the analysis engine.

If the web request matches a valid request when cross correlated against the mapping table, the analysis engine may check 380 if each captured database query matches a valid database query mapped to the valid request. If one or more of the queries does not map to the request in the mapping table, then at step 390, the analysis engine may communicate this status to the validation engine to declare an injection attack. In some embodiments, the analysis engine may use the regular expression files to perform additional validation of captured database queries prior to declaring attack. The analysis engine may check the expression parameters contained in the corresponding web request to determine if an incorrect data type or database query specific expressions/keywords were placed in the expression parameters. In some embodiments, the analysis engine may also analyze context data that maps extracted database information from a database server to user and session information related to the respective web service request for checking these expression parameters, as the format or content of the expression parameters may vary based on the particular user and session (e.g., privilege level of user or session). Such data in the expression parameters may be maliciously placed to alter the results of the database queries triggered in response to the request, so as to reveal confidential information to the attacker. The analysis engine may also check the length of the sections of the web request to determine other scenarios of maliciously altering the request to affect the triggering corresponding database queries. The analysis engine may further check the content of the resulting database queries, such as the number of expressions and the structure of the expressions, and the output of the database queries. Based on these checks, if the database queries are determined to be valid, the analysis engine may request the instrumentation engine to add the mapping of the web request to the captured database queries in the golden table. The instrumentation engine may also parse the request and database queries into regular expressions for matching against network traffic. The regular expressions may be added to the regular expression files which are stored in the golden table, or in another memory location, on the analysis engine.

Figure 3B:
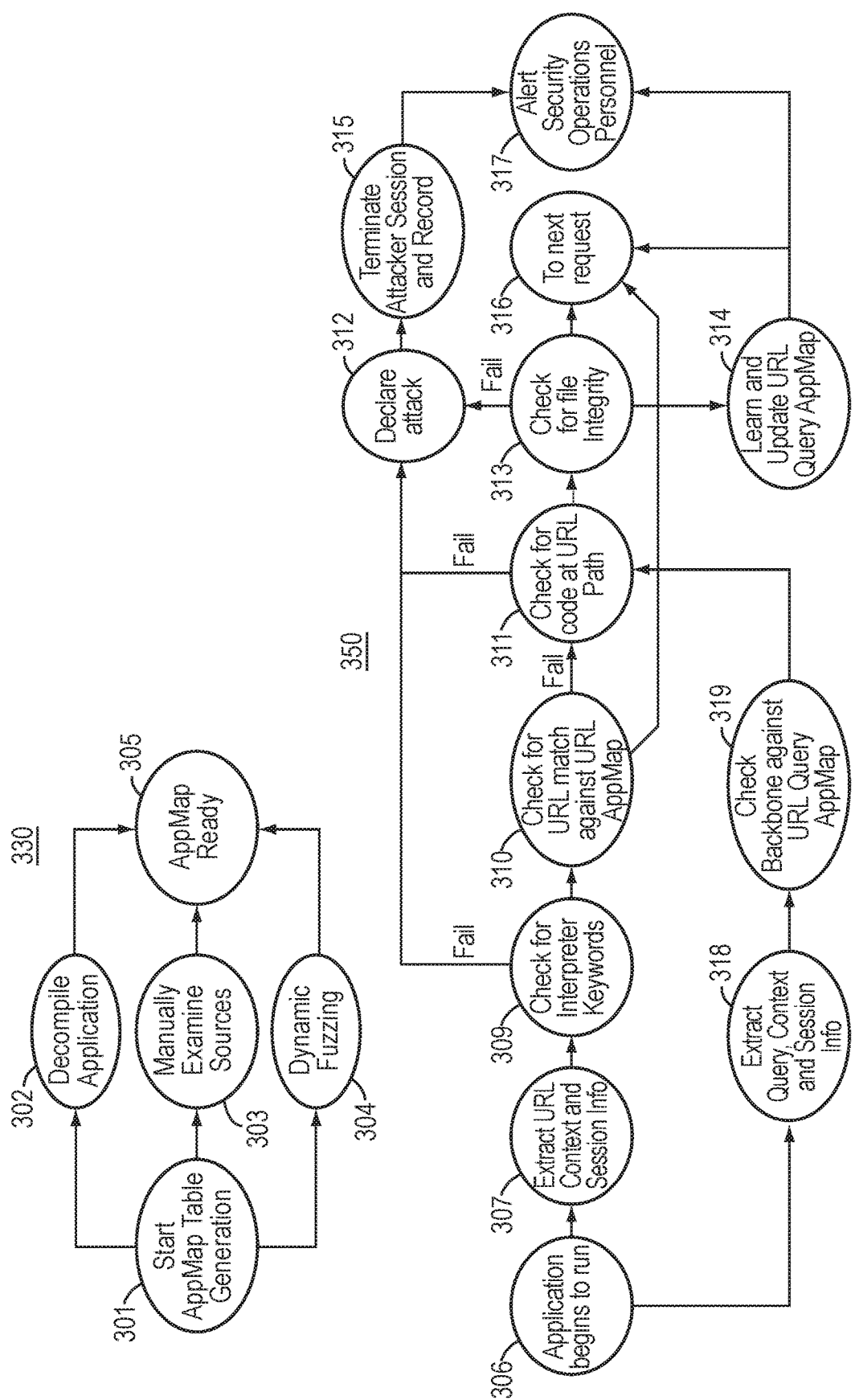
FIG. 3B illustrates flowcharts depicting detailed methods comprising the method of FIG. 3A in some embodiments of the present disclosure.

FIG. 3B illustrates flowcharts depicting detailed methods comprising the method of FIG. 3A in some embodiments of the present invention. FIG. 3B includes a flowchart for method 330 depicting the generation of the AppMap table (i.e., golden table) by the security monitoring agent in embodiments of the present disclosure. At step 301, the method 330 starts the generation of the AppMap table by communicating with the instrumentation engine configured on the web server 240 or the application server 260 executing a web application. The security monitoring agent may request that the instrumentation engine generate the AppMap table by one or more of decompiling the application (step 302), enabling manual examination of the sources of received web requests (step 303), and dynamic fuzzing (step 304). For each of these steps (302, 303, and 304), the method 330 determines the valid web requests for the web application and corresponding database queries triggered from each valid web request.

In step 302, the instrumentation engine uses code analysis to decrypt and decompile the one or more methods used by the web application for processing received web requests to determine each valid web request. Step 302 further parses from the decrypted/decompiled code the valid database queries that are produced from each given valid web request, and stores a mapping of each web request to the respective valid database queries in the AppMap table. Step 303 enables a user to manually examine sources (URIs) to determine the valid paths to the URIs that may be contained in a valid web request, and stores mappings of the valid paths to the URIs in the AppMap table. Step 304 uses dynamic fuzzing techniques to extract the relationship between URIs (the paths of which may be contained in a valid web request) and valid database queries triggered in response to the web request for the respective URI. The dynamic fuzzy techniques may, for each method, examine simulated web request with different permutations of expressions and keywords for determining the valid database queries, and store a mapping of each web request to the respective valid database queries in the AppMap table. At step 305, the forming of the AppMap table based on one or more of steps 302, 303, and 304 is complete and ready for use to examine captured web requests.

FIG. 3B includes a flowchart for method 350 depicting the capturing and processing of web requests to detect security attacks, such as an injection attack. At step 306, the web application begins to run with the instrumentation engine monitoring the web application. At step 307, the instrumentation engine captures a web request and extracts URL, context, user, and session information from the captured web request to identify the web request during processing of URL checks on the web request. The instrumentation engine, at step 309, then proceeds to check for interpreter keywords in the web request, and if such keywords are found, at step 310, checks for a URL match for the web request against the URL in the AppMap. If the URL match succeeds, at step 316, the instrumentation engine proceeds to processing the next received web requests (allowing the current web request to continue processing at the application server). If the URL match fails, at step 311, the instrumentation engine checks for code at the URL path (e.g., methods of the web application for processing the web request), and if no such code exists for the web application, the instrumentation engine may communicate with the analysis engine, at step 312, to declare an attack. The analysis engine may further communicate with the web server to, at step 315, terminate the attacker session and record (i.e., the session and record processing the web request), and, at step 317, to alert security operations personnel. In some embodiments, the instrumentation engine may check for file integrity (e.g., the files containing the methods of the web application have not been altered), at step 313, prior to declaring an attack. In these embodiments, the instrumentation engine would proceed to steps 312-317 at the failure of both the check for code at the URL path (step 310) and check for file integrity (step 311).

Similarly, at step 318, the instrumentation engine captures a web response and extracts query content and session information from the captured web response to identify the web response during processing of database query checks on the web response. At step 319, the instrumentation engine, then proceeds to check the backbone of the query context and URL corresponding to the session information against the mapping in the AppMap table. The instrumentation engine, at step 311, then checks for code at the URL path (e.g., methods of the web application for processing the web request), and if no such code exists for the web application, the instrumentation engine may communicate with the analysis engine, at step 312, to declare an attack. The analysis engine may further communicate with the web server to, at step 315, terminate the attacker session and record (i.e., the session and record processing the web request), and, at step 317, to alert security operations personnel. In some embodiments, the instrumentation engine may check for file integrity (e.g., the files containing the methods of the web application have not been altered), at step 313, prior to declaring an attack. In these embodiments, the instrumentation engine would proceed to steps 312-317 at the failure of both the check for code at the URL path (step 310) and check for file integrity (step 311).

Note, a URL check of a web request may comprise a subset of the steps 306, 307, 309, 310, 311, 312, 313, 315, 316, and 317. A data query check of a web response may comprise a subset of the steps 306, 318, 319, 311, 312, 313, 315, 316, and 317.

Formation of Golden Table

Figure 4A:
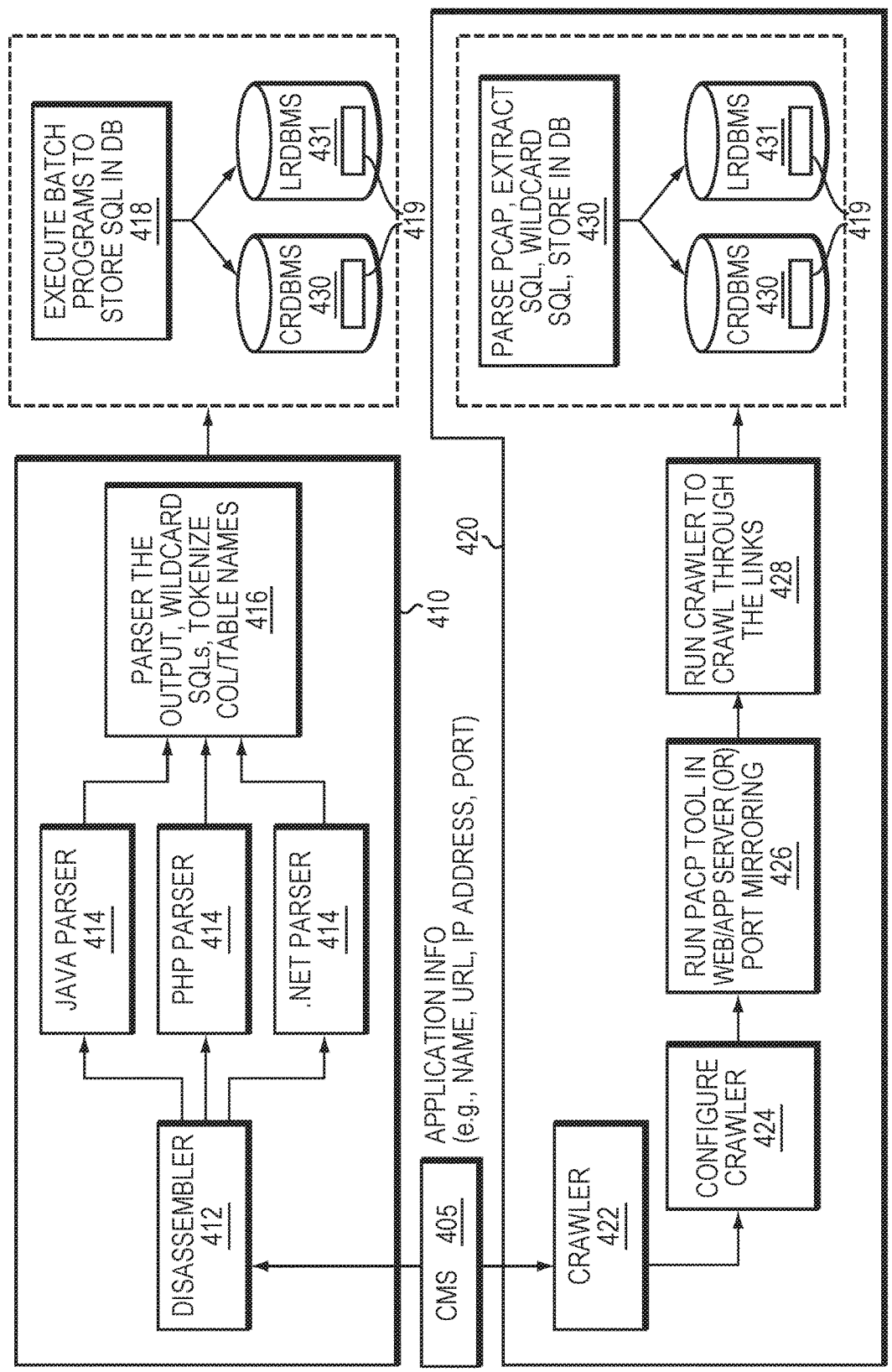
FIG. 4A illustrates a block diagram of example methods for forming a table of valid web requests and corresponding database queries in embodiments of the present disclosure.

FIG. 4A illustrates a block diagram of processes for forming a table of valid web requests and corresponding database queries in embodiments of the present disclosure. Some embodiment of the disclosure may use the static process 410, other embodiments may use the dynamic process 420, and yet other embodiments may use a combination of the two processes. Alternately, in other embodiments, a human operator, rather than a golden table, may be used to confirm the authenticity of the web request and web queries in the method of the application (e.g., based on the corresponding URI or URL).

Dynamic Formation of Golden Table

FIG. 4A at 420 illustrates a block diagram of an example dynamic process for forming golden tables in some embodiments of the disclosure. In the dynamic process, the instrumentation engine, in communication with the CMS 405, may determine the valid requests by extracting the one or more methods used by the application for processing the requests. The one or more methods may be contained in files located in a directory structure on the web server 240 or application server 260. These files may be of scripting language: .NET, PHP, HTML, CGI, CGI Fast, Python, Ruby, Java, or other such scripting languages used for web applications. The instrumentation engine may extract the one or more methods using various tools, including a crawler or spider tool, a scraping tool, and a packet capture tool, to recursively traverses the files located in a directory structure. FIG. 4A at 420 shows the instrumentation engine initiating a crawler tool 422 and configuring the crawler tool 424. In some embodiments, a scraping tool may also be configured and initiated with the crawler tool. FIG. 4A at 420 further shows the instrumentation engine initiating a packet capture tool (PCAP) 426 on the web server 240, application server 260, or port mirrors to one of these servers. In other embodiment, other packet capture tools may be used, such as Wireshark or BURP.

After initiating such tools, the instrumentation engine may first extract the one or more methods by executing the crawler tool 428 through the method (or links). In each extracted method, the instrumentation engine must also identify the valid data types of the expression parameters for each method. In some embodiments, the crawling and scraping tools may identify the valid data types for the expression parameters of each method as part of the extractions process. In other embodiments, the instrumentation engine may analyze database tables retrieved from the web database application 275, by communication with the database server 270, to determine the valid data types for each expression parameter. As part of analyzing the database tables, the instrumentation engine may need to determine the column names and data types of each column in each database table to identify all data types for each method. The instrumentation engine may also determine the wild card format for the web method, including the correct format (i.e., length of each expression in the method), which may be stored in the golden table or in regular expression files.

Using the extracted methods and corresponding data types for the expression parameters, the instrumentation engine may form the web requests for the web application. For each method, the instrumentation engine may form one or more web requests by using different permutations of the valid data types for the expression parameters of the method. Then, the instrumentation engine may simulate (i.e., fire) each of the formed web request with contextually appropriate user and form data. Using an initiated packet capture tool (PCAP), the instrumentation engine may capture the database queries 430 triggered in response to each simulated request. Note, to capture the application packets, the instrumentation engine may identify the packets as being for the particular application using identifying information, such as the application's name, URL, IP Address, or port, which may be configured at the CMS 405.

More specifically, as the web application framework processes a web request, such as each of the simulated requests, a series of workflow events are generated by the web application. The web application framework may process the workflow events, in synchronous mode (i.e., synchronously) or in asynchronous mode (i.e., asynchronously). For example, in the synchronous mode, one thread performs all request related processing, database input/output, and web response related processing. In the asynchronous mode, one thread performs request related processing, another thread performs database input/output, and a third thread performs response related processing.

By examining a series of representative steps in the workflow using features of the packet capture tool, such as a parser component (e.g., PCAP Parser), and tracing the session ID of the web request at each step, the instrumentation engine may associate the web request to database queries triggered by the application. In some embodiments, the association may map well-known URLs to specific queries performed by the application. The mapping of the web request to the parsed database queries is stored in the golden table 419. Note, some requests may not trigger any database queries, while other requests may trigger one or more database queries. If the web request does not trigger any database queries, this information may be recorded in place of queries in the golden table 419 for the request. The parser component of the packet capture tool may parse the database queries from the packet data as both the full database query and as wildcard queries. The instrumentation engine may also determine the expression count for each database query, the wild card format for each database query, and output generated from each database query, which may be stored in the golden table or in regular expression files.

Note, the golden table may be stored 419 at both the CMS 405 in the CRDBMS database 430 and on the analysis engine in the LRDBMS database 431. The golden table may be further copied to the mapping table in the regular expression engine, which is the hardware processor component of the analysis engine. The copying of the golden table to the REGEX engine may include copying the regular expression files. The golden table enables enumeration of the set of web requests and the corresponding database queries. By examining the same workflow events at runtime, the instrumentation engine may also map a web request to corresponding database queries in real-time for each established session and store the mapping in the golden table. As such, the golden table may be dynamically formed at either load time or runtime, and continuously updated at runtime. Any runtime updates to the golden table may be periodically downloaded to the REGEX engine for updating the mapping table.

Static Formation of Golden Table

The instrumentation engine may also form the golden table statically at either load time or run time. In some embodiments, when forming the golden table statically, the instrumentation engine may still determine and store the valid web requests as described in the dynamic case. In other embodiments, the instrumentation engine may determine the web requests, along with the associated database queries, by code analysis (e.g., dynamic fuzzing techniques). FIG. 4A at 410 illustrates a block diagram of an example static process in some embodiments of the disclosure. In the process, the instrumentation engine, in communication with the CMS 405, may use a code disassembler 412 to disassemble the code (i.e., methods) from the scripting language files (e.g., PHP, HTML, CGI files, Python, Ruby, and Java) located in the directory structure on the web server 240 or application server 260. The disassembled code may be structured in a format to improve parsing of the disassembled code, such as in a sitemap structure. The instrumentation engine may then use one or more parsers (e.g., Java Parse, PHP Parser, .NET Parser, Python Parser, Ruby Parser, and any other dominant Scripting Language Parsers) 414 to analyze the disassembled code to determine each web request processed by the code (if not instead determined using the dynamic process). In some embodiments, the instrumentation engine may also use the one or more parsers 414 to analyze database tables from the web application databases to determine the valid data types for the web requests. In other embodiments, the instrumentation engine may use context data correlating database information from a database server to user, session, context information for a web service request to determine the valid data types for the web service request. In other embodiments, the instrumentation engine may determine the valid data types for each request from the disassembled code.

The disassembled code may then be further parsed and analyzed to determine each database query that is triggered in response to a determined web request. The one or more parsers 414 may output 416 each parsed database queries from the disassembled code as the full database query, as wildcard queries, or as tokens. The instrumentation engine may then store a mapping of the web request to the parsed database queries in the golden table 419. The instrumentation engine may also determine the wild card format for each web method, including the correct format (i.e., length of each expression in the method), which may be stored in the golden table or regular expression files. The instrumentation engine may further determine the expression count for each database query, the wild card format for each database query, and output generated from each database query, which may be stored in the golden table or regular expression files. The instrumentation engine may also use dynamic fuzzing techniques to extract the relationship between the URI and the corresponding database queries. Note, the golden table (including a URI-database query entries) may be stored 419 at both the CMS in the CRDBMS 430 database and on the analysis engine in the LRDBMS 431 database by use of batch programs 418 executed by the instrumentation engine. The golden table may be further copied to a mapping table in the REGEX engine. The copying of the golden table to the REGEX engine may include copying the regular express files. The golden table may be statically formed at either load time or runtime, and continuously updated at runtime. Any runtime updates to the golden table may be periodically downloaded to the REGEX engine for updating the mapping table.

Parsing Database Queries

Figure 4B:
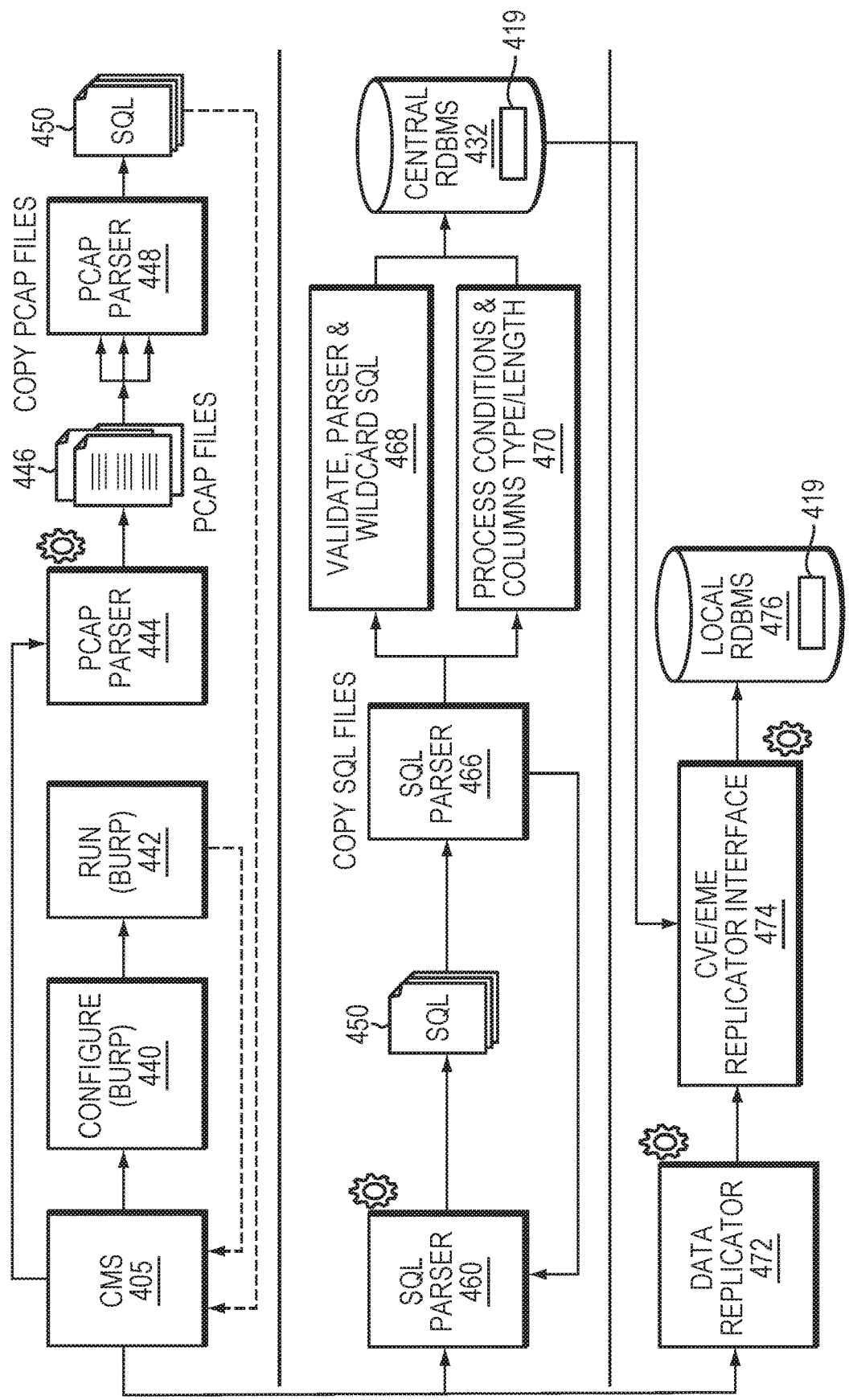
FIG. 4B illustrates a block diagram of an example method for dynamically capturing and parsing database queries in embodiments of the present disclosure.

FIG. 4B illustrates a block diagram of a method for dynamically capturing and parsing database queries in embodiments of the present disclosure. In this embodiment, the instrumentation engine may configure 440 and initiate a packet capture tool (e.g., BURP) to capture 442 the web requests from the web network traffic. The instrumentation engine may further use the packet capture tool to capture 442 the database queries triggered in response to each captured web request, in the same manner as described in regards to dynamically forming the golden table. The parser component of a packet capture tool (e.g., PCAP Parser) 444 may parse the captured database queries into parser files (e.g., PCAP Files) 446. The parser files may then be further parsed 448 into the query language (e.g., SQL) structure 450 for the database queries. This structure may be sent to CMS 405 to be data replicated 472, and using a replicator interface (e.g., CVE/EME) 474, stored in a golden table 419 in a local RDBMS database 476. If the queries later need to be copied to the golden table, the parser files may then be retrieved from the CMS 405, and parsed by a database parser (e.g., SQL Parser) 460 into individual database statements 450. These statements may be further parsed by the database parser 466 into wildcard database statements 468 and statement components 470, such as process conditions, column types, and column lengths. The statements and statement components may then be stored in the golden table 419 in a Central RDBMS 432 on the security monitoring agent mapped to the corresponding web request. The statements and statement components may also be formulated into regular expression, which are written to regular expression files stored in the Central RDBMS 432. The golden table and regular expression files are copied to the mapping table of the REGEX engine during the next synching period.

In other embodiments, the REGEX engine may be programmed to capture each web request and corresponding database queries. In these embodiments, the REGEX engine may be further programmed to use regular expressions to determine the request format and query language format of the database queries. The REGEX engine may use the files as part of this processing. As, the REGEX engine may be comprised of a high speed processing fabric, the REGEX engine may process the web request and database queries in real-time.

Validate Web Requests

FIG. 5A illustrates a chart of an example process for validating a web request (e.g., URL) and the corresponding database queries (e.g., SQL) triggered in response to the web request. The chart shows the different permutations of validation checks and results when checking the request and corresponding database queries. In some embodiments, this example process may be performed by the instrumentation engine, and in other embodiments, this example process may be performed by the REGEX engine using regular expression files. As shown in column 502, a web request is first checked to determine whether the request is specified as producing (i.e., triggering) database queries. If the request is determined to be database query producing, the request may be checked at column 504 to determine whether the request is in the correct format (e.g., expressions of the request are of the correct length). For example, the request may be checked to determine if it contains a path to a known universal resource identifier (URI) or universal resource locator (URL). Note, in some embodiments, a human operator may confirm the authenticity of the request by, for example, confirming that the path contained in the request corresponds to a known URI. If the request contains a known path, then the request may be checked to determine the authenticity of the target code (e.g., whether the request correlated to a valid web request when cross correlated against valid web requests in the golden table or correlates to one or more methods used by the application). The request may then be further examined to determine if query language keywords and expression are present in the correct format in the request.

Note, the web request is not in the correct format or absent from the table, in some embodiments, the processing of the web request may be terminated and the request discarded. In other embodiments, the REGEX engine may communicate to the instrumentation engine the incorrect format, and the instrumentation engine take actions to check if the request is actually a valid request that should be in the golden table. The instrumentation engine may execute a crawler tool to determine whether the respective method exists in the directory structure on the web server 240 or application server 260, and if it does, check the corresponding data types in the web application database 275 or using code analysis (e.g., dynamic fuzzing techniques). If the check validates the request, then the request may be simulated to determine the corresponding database queries, using the same process as when dynamically forming the golden table, or code analysis may be used to determine the corresponding database queries, using the same process as when statically forming the golden table. The web request and correspond database queries may be added to the golden table, and copied to the mapping table of the REGEX engine during the next synching period. In some embodiments, as shown in 506, the processing of the web request may continue, and the incorrect format may be communicated to a validation engine to be used as an event for correlating an attack status.

If the web request matches a valid request when cross correlated against the mapping table, the REGEX engine, or instrumentation engine depending on the embodiment, may check if each captured database query matches a valid database query mapped to the valid request. That is, each database query may be checked as shown in column 506 to determine whether the respective query maps to the captured request in the mapping table (i.e., SQL Golden Copy). If one or more of the queries does not map to the request in the mapping table, the REGEX engine, or instrumentation engine depending on the embodiment, may communicate this status to the validation engine to declare an injection attack. In other embodiment, the triggering of the query may instead be halted and additional checking may be performed on the query, as shown in column 510. The database query may be given a preliminary status of potential threat, which may be communicated to the validation engine, while these additional checks are performed.

The additional checks may include determining if the database query is actually a valid query for the request, but was inadvertently missed in forming the golden table. Note, a database query (e.g., SQL query) is composed of a set of ordered database query language keywords interspersed with one or more database query language expressions. For example, a database query may include the statement: "SELECT username FROM table1 WHERE username=Jones". Each expression of the statement (e.g., "username=Jones") has three parts: (1) the expression begins with a database object, such as a column name (e.g., "username"); (2) the database object is followed by a conditional operator (e.g. "="); and (3) the operator is then followed by user provided data from the web request (e.g., "Jones"). In a database injection attack, the attacker cleverly appends keywords/expressions into the user provided data. For example, instead of "Jones", the user provided data may be specified as: "Jones AND zipcode=01720" (i.e., appended "AND zipcode=01720" to the end of the data).

The REGEX engine (or instrumentation engine) may first check the database query to determine whether the user provided data of the database query, which was taken from the web request, contains the correct database object names (e.g., "username") and data types defined for that request (e.g., that the data is a string, such as "Jones", and not another data type, such as a number). To perform this check, the REGEX engine may use regular expression files. In some embodiments, the REGEX engine may use context data mapping the database query to a particular user and session in performing this check. The instrumentation engine may instead, or in addition, analyze the corresponding methods for processing the request in the directory structure of the web server 240 or application server 260 and analyze the corresponding objects in the web application database 275. The REGEX engine or instrumentation engine may also check if the user provided data contains additional query language keywords and expressions, such as "AND zipcode=01720" in the above example, which is an indication that a malicious actor is attempting to alter the database queries to gain additional information from the database.

Further, as shown in column 512 of FIG. 5A, other false positive mitigation checks may be performed, such as simulating the request with appropriate values and comparing expression count 508 with the expression count in the database query. If the checks validate the user provided data, the triggering of the database query may continue. In addition, the corresponding web request may be simulated at the instrumentation engine to determine all missing database queries for that request, using the same process as when dynamically forming the golden table, or code analysis (e.g., dynamic fuzzing techniques) may be used to determine the missing database queries, using the same process as when statically forming a golden table. The web request and correspond database queries may be added to the golden table and regular expression files, and copied to the mapping table of the REGEX engine during the next synching period, as shown in column 516 of FIG. 5A.

Based on these checks, and additional false positive mitigation checks, as shown in column 512, the validation engine may determine an attack state, as shown in column 514. Then, based on the current attack state of the application as correlated by the validation engine using a state machine, and the application may be assigned a final result attack state, as shown in 516.

Regular Expression Files

FIG. 5B illustrates example regular expression files used by the REGEX engine to detect and validate attacks in embodiments of the present disclosure. File 1 on the REGEX engine contains the URL/Method Golden List, including the URL_TYPE indicating if a web request (e.g., URL) is database query (e.g., SQL) producing. A captured web request may be referenced against File 1 to determine whether it is a database query producing web request. File 2 on the REGEX engine contains the URL/Method Golden List with Wildcards, including the WC-LENGTH indicating the correct format for the request, and URL_TYPE indicating the check is for database query producing requests only. The captured web request may be referenced against File 2 to determine whether it is in the correct format. File 3 contains the SQL/Golden List with Expression Count, including the Expression Count indicating the correct number of expressions for a database query. The captured web request may be referenced against File 3 to determine whether it has the correct expression count. File 4 contains the SQL/Golden List with Wildcard Length, including the WC_LENGTH indicating the correct length of the expressions for a database query. The captured web request may be referenced against File 4 to determine whether it has expressions of the correct length. In some embodiments, the output of the captured database query may also be referenced against an additional file on the REGEX engine to determine whether the captured query output matches valid output (e.g., in format or content) for the query.

Attack Chain of Events

Figure 6A:
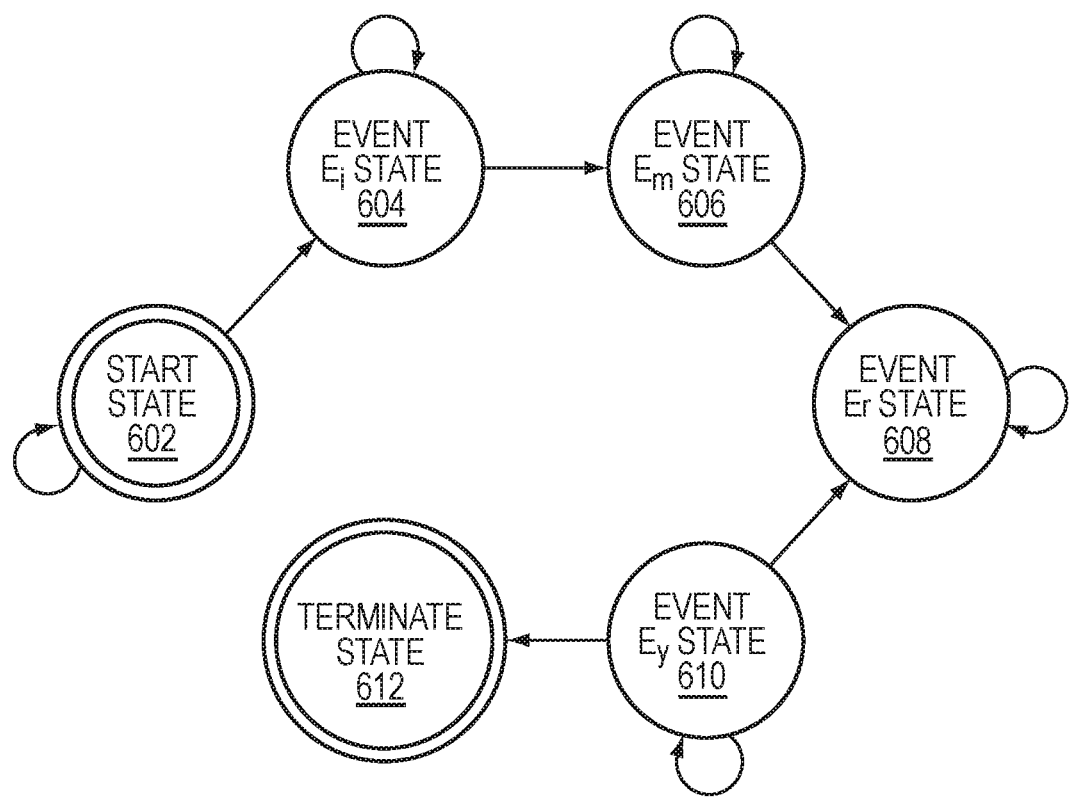
FIG. 6A illustrates an example event chain state machine used to track generated events in embodiments of the present disclosure.

FIG. 6A depicts an Event Chain State Machine used to track detected security events, such as the injection attack described above, in embodiments of the present invention. Being able to detect and block the chain of events for malicious attack scenarios, such as an injection attack scenario, reliably is a key component of thwarting such advanced persistent threats. Contemporary cyber security tools suffer from major shortcomings. First, as described above in regards to FIG. 1, these tools do not examine the application at a low enough granularity, such as detecting SQL expressions inserted into web requests. Without this capability, many signs of attacks cannot be discerned reliably. Next, these tools do not have the capability to track the attack over time. The typical security information and event management (SIEM) systems only correlate events (that are of too high a granularity) for typically 24 hours. Malware can simply lie dormant for a long enough period of time to escape detection through any such time and event correlation based mechanisms. Without the capability to track the attack reliably over time, the individual malicious events contributing to the attack appear as disjoint un-correlated events.

In addition, these cyber security tools depend on security analysts to set the threshold of events that signify an attack. For example, one security analyst may have internalized that some number of port scans and login attempts per hour will occur in the normal course of the day. The question then becomes how many port scan attempts per source per hour are one too many before an alert is triggered. Further, if an alert is generated for every port scan, an analyst may be investigating port scans with no malicious intent. If an alert is raised too late or never due to raised thresholds, then the malware attack may have already succeeded. Furthermore, these tools have an incomplete knowledge base to effectively detect the attack, and as such, these tools generate so many false positives that the typical security analyst gets drowned by the noise. The ability to generate truly genuine alerts requires the cyber security tools to distinguish between benign and malicious events precisely and reliably. A malicious actor would be aware of the same set of signatures or known suspicious network or application behaviors. Therefore, the malicious actor can weaken the detection of the attack, such as using encryption to encode the data, changing IP and port combinations, or by slowing down the attack so as to avoid detection based on the behavior specified in the knowledge base.

The Path Validation Engine generates events and tracks the state of the events in accordance with the event chain state machine shown. The Event Chain State Machine uses records stored in various internal databases, such as a Transition Playbook Database to track these events. When a new thread starts, the Event Chain state machine is initialized to Start State at 602. The Event Management Engine 723 serializes events, such as the attack state shown in FIG. 5A, so that the set of events on one thread are updated on the state machine for the appropriate thread. As transitions occur on the thread, the state machine records the target address but stays in the Start State. When the Path Validation Engine generates a medium or high severity event, the Event Chain state machine advances to the next state, the $E_i$, state at 604. This new state continues to record the target address of transitions as they occur. This process of the state machine updating to a new state on medium and high severity events and recording transition events continues at 606, 608, and 610 until the thread reaches the Terminate State at 612. The Security Analyst is notified when a highest severity level event is triggered and the Event Chain State Machine captures the forensics when an attack occurs.

Depending on the modes of the system, there are various remedial actions that can be taken in response to such security events. The remedial actions taken can be performed in real-time. One remedial action may consist of shutting down the web application. Other remedial actions may be to release the socket(s) associated with the threads on which the threat has appeared; terminate the thread on which a threat has appeared, and/or blacklisting the user that caused the threat. Another remedial action would be to unblock all sockets associated with the application server's socket(s). This will block all users connected at the time. Another remedial action would be to logout the offending user by removing his/her session ID from the database. The next request or response would then not be delivered to the attacker. Yet another remedial action may be to ignore the attack. This may be due to the analyst not considering the attack to be of major consequence. The most appropriate suggested remedial actions for a given event are pre-programmed so that if the security analyst has chosen to operate the Analysis Engine in automatic mode, the remedial action occurs automatically.

The Path Validation Engine of the Analysis Engine can be run in three modes: Monitor or Paranoid mode. The difference between these modes is how and when to enforce the remedial actions associated with the event(s) received on a given thread in the application. In the Monitor mode, as runtime information arrives and is analyzed by the Analysis Engine, it generates notifications that are directed to the designated security analysts. It is then the security analyst's job to intervene and choose the most appropriate remedial action. The security analyst may decide to change an "ignore" type pre-programmed remedial action to a higher impact remedial action even before the thread has reached the Terminate State. On finalizing the remedial action, the Analysis Engine implements the remedial action when the appropriate authority in the enterprise clears the proposed remedial action for a given thread.

In the paranoid mode, the programmed (default or user configured) remedial action is executed automatically without any manual intervention from the security analyst. In either mode, once the remedial action is ready to be carried out, the analysis engine lets the security monitoring agent (i.e., Monitoring Agent) know which remedial action to carry out. The Monitoring Agent then performs the action associated with the remedial action on the application. Once the remedial action is completed, the Monitoring Agent sends a confirmation message back to the analysis engine. On receiving the acknowledgement, the analysis engine performs housekeeping including updating the security analyst.

In learning mode, the analysis Engine ignores all events and remedial actions. In this mode, the application runs in a pristine environment and records all events and event chains. The security analyst uses this information to build criteria for when an event should be raised and what remedial action should be associated with the said event.

Attack State

Figure 6B:
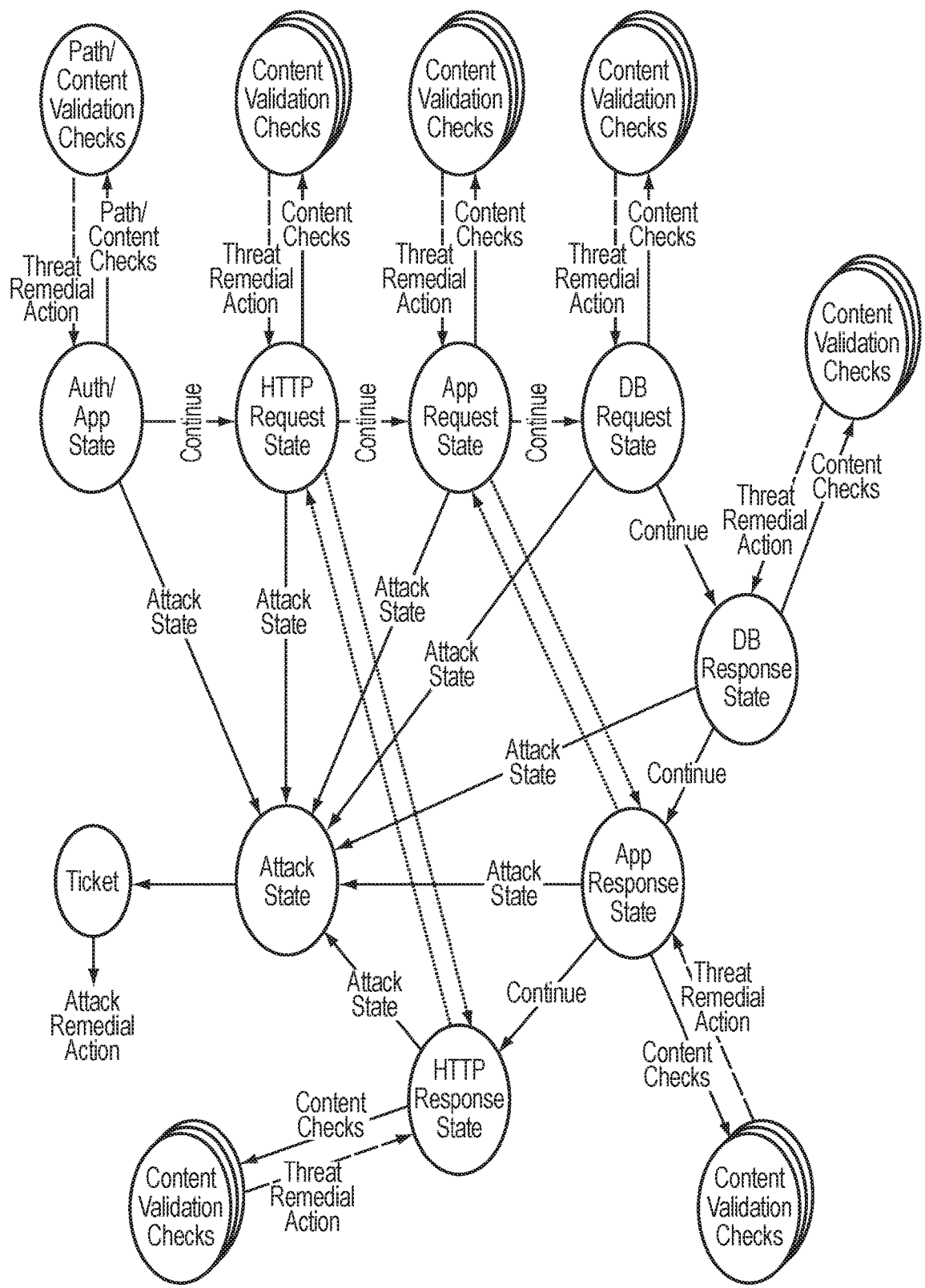
FIG. 6B illustrates an example flow chart used to track attack states based on path and content validation in embodiments of the present disclosure.

FIG. 6B illustrates a flow chart for tracking attack states based on path and content validation to detected security events, such as the injection attack described above, in embodiments of the present invention. In this example, the instrumentation engine accesses extended context data (i.e., extended with data structures from Appendix A) from the web server 240 and application server 260 at different processing states of a HTTP request and respective HTTP response. The instrumentation engine may call different application programming interfaces (APIs) to access the context data during the different processing states. For example, at the web server 240, the instrumentation engine calls a respective API to access the context data during the Authentication/Application State, HTTP Request State, and HTTP Response state. For another example, at the application server 260, the instrumentation engine calls a respective API to access the context data during the App Request, DB Request, DB Response, and App Response states. By calling the respective API, the instrumentation engine makes a content check call that transmits the information from extended context data to the ARMAS Appliance for analysis as part of a Path or Content Validation Check. As part of the Path/Content Validation Check may determine a potential threat (Attack State) requiring Remedial Action based on the correlation of user and session information contained in the extended data. If the Path/Content Validation Check results in determining a Threat Remedial Action are required, the ARMAS Appliance reports the Attack State and generates a Ticket at the User Interface (Dashboard) for remedial action. Otherwise, the context data continues through the processing states of the HTTP request and respective HTTP response. In other embodiments, the instrumentation engine may extract data from a captured web service request or response using other methods, such as a traffic capture tool, and provide similar APIs for validating the path or content of HTTP requests and HTTP responses.

Application Runtime Monitoring and Analysis (ARMAS) Infrastructure

Figure 7A:
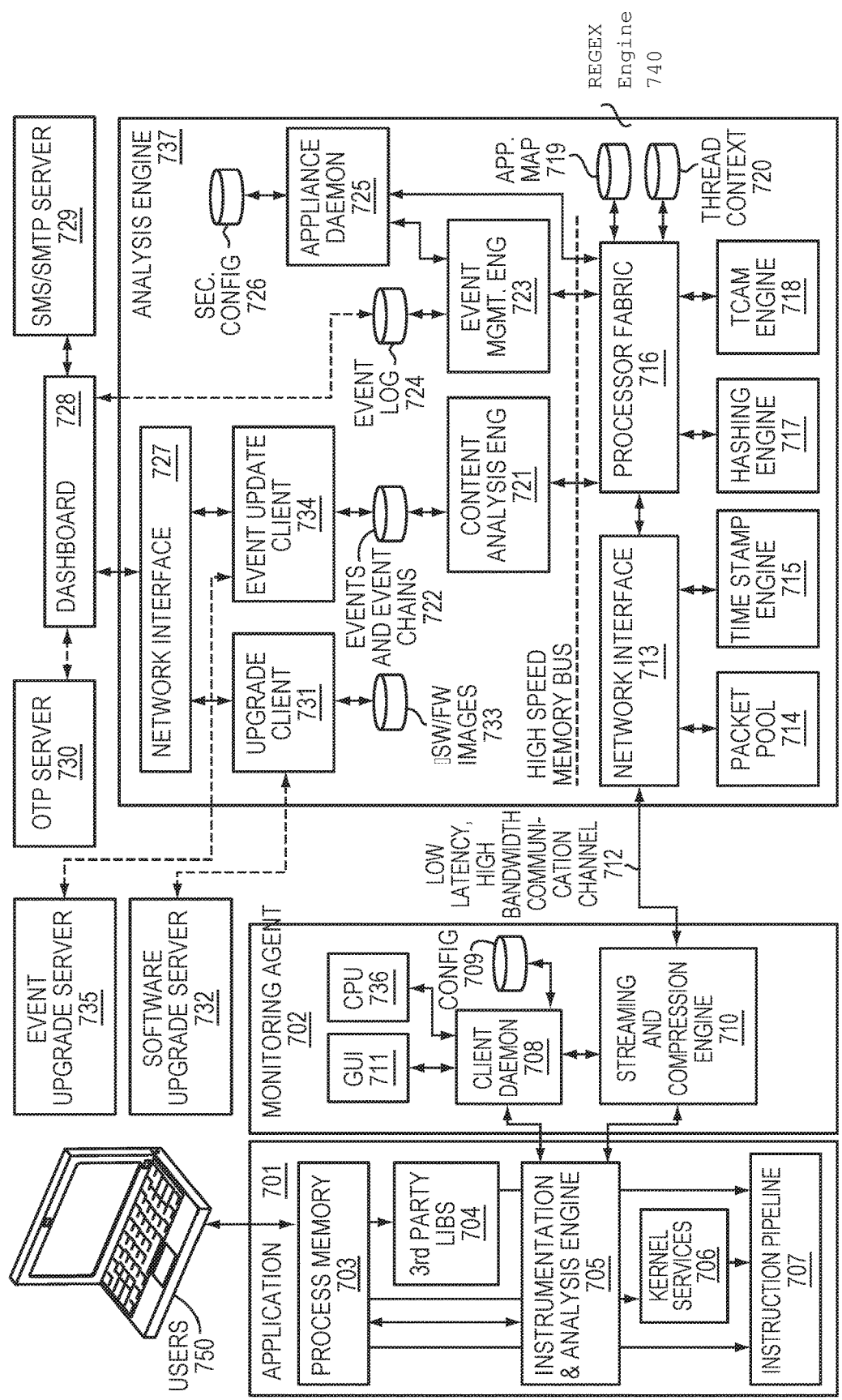
FIG. 7A illustrates an example block diagram of the application runtime monitoring and analysis (ARMAS) in embodiments of the present disclosure.

FIG. 7A depicts a high level block diagram of an example application runtime monitoring and analysis (ARMAS) infrastructure. This infrastructure may be configured on a various hardware including computing devices ranging from smartphones, tablets, laptops, desktops to high end servers. As shown in this figure, data collection performed by the Monitoring Agent 702 may be segregated from analysis performed by the Analysis Engine 737 to improve application performance. The infrastructure provides high availability to prevent hackers from subverting its protection against malware attacks. The Monitoring Agent 702 interacts with an application to gather load time and runtime data. The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 750 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the instrumentation engine 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Analysis Engine 737 and itself. The Client Daemon also ensures that if any Monitoring Agent 702 process, including itself, becomes unresponsive or dies, it will be regenerated. This ensures that the Monitoring Agent 702 is a high availability enterprise grade product.

The Instrumentation and Analysis Engine 737 pushes load and runtime data collected from the application into the Streaming Engine. The Streaming Engine packages the raw data from the Monitoring Agent 702 into the PDU. Then it pushes the PDU over a high bandwidth, low latency communication channel 712 to the Analysis Engine 737. If the Monitoring Agent 702 and the Analysis Engine 737 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 737 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which makes up the REGEX Engine 740. The infrastructure of the Analysis Engine 737 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 728, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine 737 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 737 performs searches, it may, from time to time find an invalid transition, invalid operation of critical/admin functions or system calls, or find a memory write on undesirable locations. In each of these cases, the Analysis Engine 737 dispatches an event of the programmed severity as described by the policy stored in the Event and Event Chain database 722 to the Event Management Engine 723. The raw event log is stored in the Event Log Database 724. The Dashboard can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard 728 accordingly. The Dashboard provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 737. For this purpose, it must read configuration information from the Analysis Engine Configuration database 726. The daemon is also responsible for running a heartbeat poll for all processes in the Analysis Engine 737. This ensures that all the devices in the Analysis Engine 373 ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 737 or of the Client for purposes such as fixing errors in the software. For this purpose, the Upgrade Client 731 constantly checks with the Software Upgrade Server 732 where the latest software is available. If the client finds that the entities in the Analysis Engine 737 or the Client are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 737 or the Monitoring Agent 702 does not match the image for the same component in the System image, then all images will be rolled to a previous known good system image.

PDU for ARMAS Communications

Figure 7B:
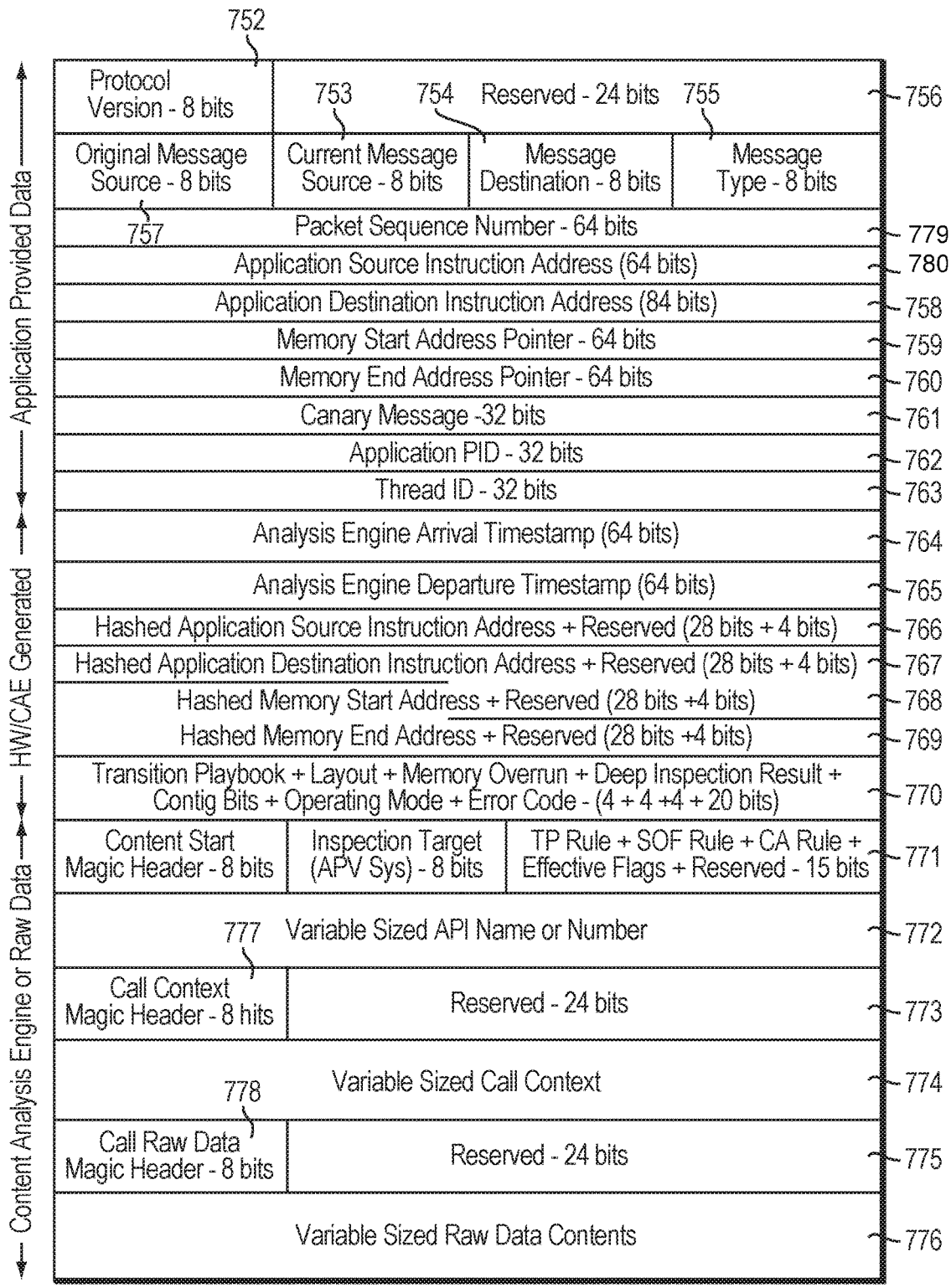
FIG. 7B illustrates an example protocol data unit (PDU) used to transmit data within the ARMAS infrastructure of FIG. 7A.

FIG. 7B illustrates an example protocol data unit (PDU) used to transmit data between the Monitoring Agent 702 and Analysis Engine 737 of FIG. 7A. In order for the Monitoring Agent 702 and the Analysis Engine 737 to work effectively with each other, they communicate with each other using the PDU. The PDU can specifically be used by the Monitoring Agent 702 to package the extracted model of the application and/or collected runtime data for transmission to the Analysis Engine 737. The PDU contains fields for each type of information to be transmitted between the Monitoring Agent 702 and the Analysis Engine 737. The PDU is divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7A. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine 737. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block
9. Client iWarp Ethernet Driver (100 Mb/1 Gb/10 Gb)

Per PCI Card Entities (Starting Address=20+n*20)
20. Securalyzer TOE block
21. Securalyzer PCI Bridge
22. Decompression Block
23. Message Verification Block
24. Packet Hashing Block
25. Time-Stamping Block
26. Message Timeout Timer Block
27. Statistics Counter Block
28. Securalyzer Query Router Engine
29. Securalyzer Assist Securalyzer Host Entities
200. Securalyzer PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database SIEM Connectors
220. SIEM Connector 1—Virsec Dashboard
221. SIEM Connector 2—HP ArcSight
222. SIEM Connector 3—IBM QRadar
223. SIEM Connector 4—Alien Vault USM Securalyzer Infrastructure Entities
230. Virsec dashboard
231. SMTP Server
232. LDAP Server
233. SMS Server
234. Entitlement Server
235. Database Backup Server
236. OTP Client
237. OTP Server
238. Checksum Server
239. Ticketing Server
240. Virsec Rules Server
241. Virsec Update Server All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Client side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 737 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine 737 hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAW Generated section additionally contains other fields related to the Canary 771 including the Hardcoded Content Start Magic header, API Name Magic Header, Call Context Magic Header and Call Raw Data Magic Header are present in all PDU packets.

The HW/CAW Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 737 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 737 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine 721. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Infrastructure

Figure 8:
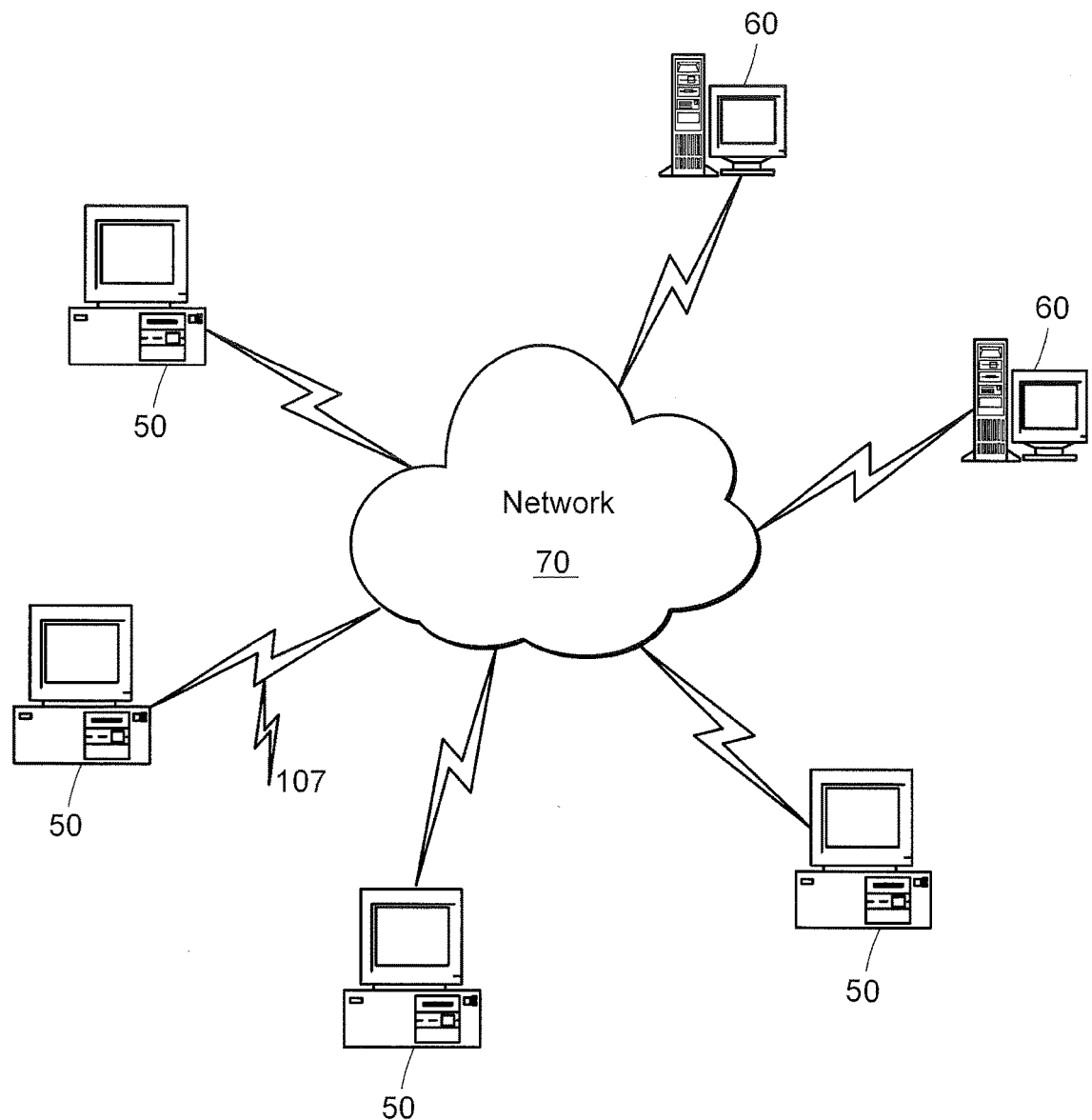
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured as the security monitoring agent. Server computers 60 may be configured as the analysis engine which communicates with client devices (i.e., security monitoring agent) 50 for detecting database injection attacks. The server computers 60 may not be separate server computers but part of cloud network 70. In some embodiments, the server computer (e.g., analysis engine) may compare captured web request and corresponding database queries against valid request and corresponding valid queries in a golden table. The client (security monitoring agent) 50 may communicate captured requests and queries, and golden table records, to the server (analysis engine) 60. In some embodiments, the client 50 may include client applications or components (e.g., instrumentation engine) executing on the client (i.e., security monitoring agent) 50 for capturing requests and queries, and the client 50 may communicate this information to the server (e.g., analysis engine) 60.

Figure 9:
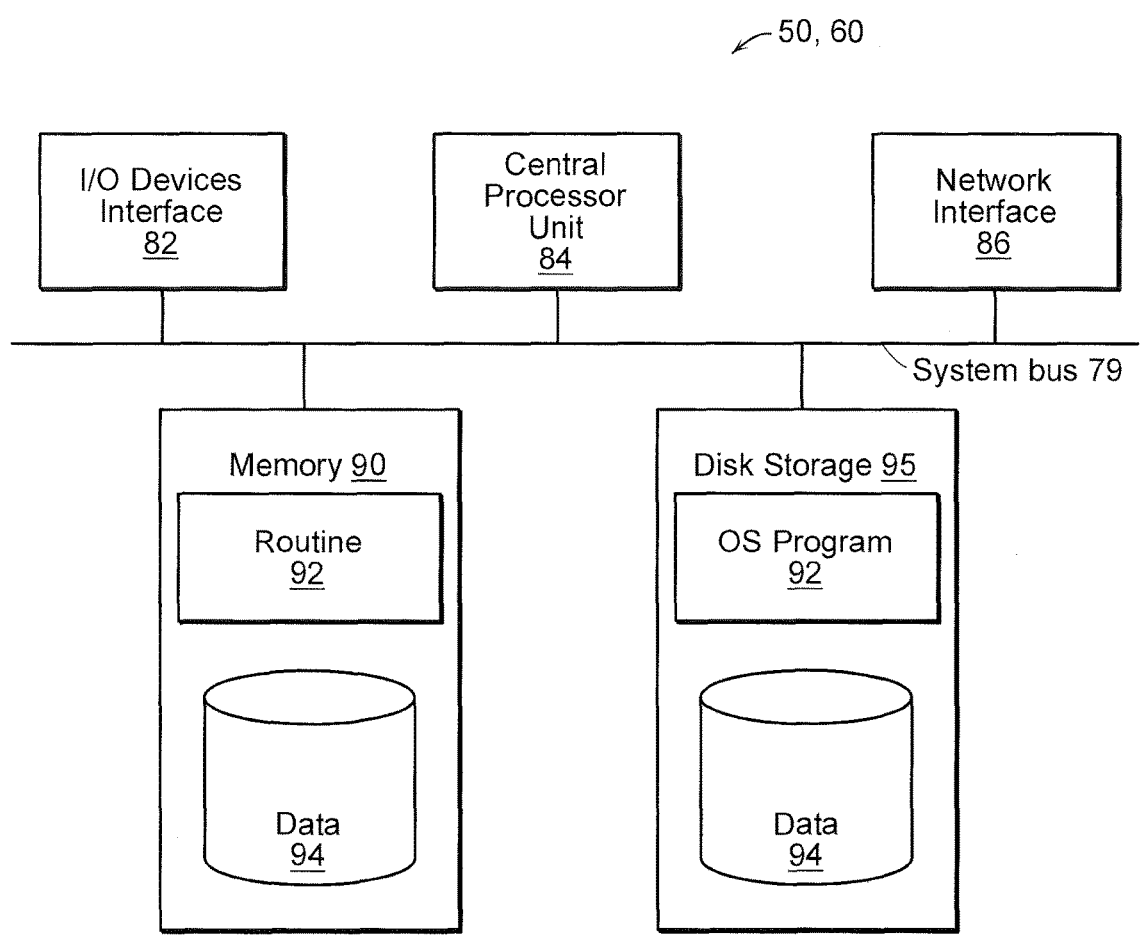
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., security monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method comprising:
   capturing a web request for a web application and one or more database queries triggered in response to the web request during runtime;
   checking if the captured web request matches a valid web request in a table mapping valid web requests for the web application to one or more valid database queries for each web request;
   if the captured web request matches a valid web request, checking in the table if each captured database query triggered in response to the web request matches a valid database query mapped to the valid web request in the table; and
   declaring an injection attack if at least one captured database query does not match a valid database query mapped to the valid web request.

2. The method of claim 1, wherein the table is formed by:
   extracting one or more methods contained in a directory structure for the web application, for each given method of the extracted one or more methods:
      identifying valid data types for one or more expression parameters of the given method; and
      forming one or more valid web requests from the given method, wherein each valid web request is formed with a different permutation of the valid data types for the one or more expression parameters of the given method.

3. The method of claim 2, wherein forming the table further comprises, for each given web request of the one or more valid web requests:
   simulating the given web request to capture one or more database queries triggered in response to the given web request; and
   storing in the formed table, the given web request mapped to the one or more captured database queries triggered in response to the given web request.

4. The method of claim 2, wherein forming the table further comprises, for each given web request of the one or more valid web requests:
   disassembling one or more files of the directory structure that process the given web request;
   parsing the disassembled files to determine each database query triggered in response to the given web request; and
   storing in the formed table, the given web request mapped to the determined database queries triggered in response to the given web request.

5. The method of claim 4, wherein dynamic fuzzy techniques are used to extract relationships between an URI and corresponding database queries to store in the formed table.

6. The method of claim 2, wherein extracting is performed by at least one of a crawler application or static code analysis.

7. The method of claim 2, wherein the directory structure contains one or more files of at least one of scripting language: PHP, HTML, CGI, Python, Ruby, or Java.

8. The method of claim 1, wherein the table is formed at load time or runtime.

9. The method of claim 1 further comprising:
   prior to declaring the injection attack, confirming that the at least one captured database query is an invalid database query.

10. The method of claim 9, wherein confirming comprises:
    checking expression parameters contained in the captured web request; and
    declaring the injection attack if at least one checked expression parameter contains: (i) data of an incorrect data type or (ii) a database expression or keyword.

11. The method of claim 9, wherein confirming comprises:
    checking at least one of length or format of at least one section of the captured web request; and
    declaring the injection attack if the checked at least one of length or format is incorrect for the at least one section.

12. The method of claim 9, wherein confirming further comprises:
    checking number of expressions in the at least one captured database query; and
    declaring the injection attack if the checked number of expressions is incorrect for the at least one captured database query.

13. The method of claim 9, wherein confirming comprises:
    checking structure of the at least one captured database query; and
    declaring the injection attack if the checked structure is invalid for the at least one captured database query.

14. The method of claim 9, wherein confirming comprises:
    checking output of the at least one captured database query; and
    declaring the injection attack if the output is invalid for the at least one captured database query.

15. The method of claim 9 further comprising:
    if the at least one captured database query is determined to be a valid database query, adding the at least one captured database query mapped to the valid web request in the table.

16. The method of claim 1 further comprising:
    if the captured web request does not match a valid web request: determining if the web request represents a valid web request for the web application by comparing the web request to one or more methods contained in a directory structure for the web application;
    if the web request is a valid web request, simulating the web request to capture one or more database queries triggered in response to the web request; and
    storing in the table, the web request mapped to the one or more captured database queries.

17. The method of claim 1, wherein the web request is an URL query.

18. The method of claim 1, wherein the database query is a SQL query and the injection attack is a SQL injection attack.

19. The method of claim 1, wherein capturing is performed by instrumenting instructions in the web application at load time.

20. The method of claim 1, wherein the method further comprises:
capturing database information from a database server;
extracting database query information for one or more database queries from the database information at an application server;
inserting the extracted database query information from the application server into context data sent to one or more threads of a web server;
correlating, at the web server, user, session, URI, success/failure flag, and context information to the database query information in the context data; and
declaring the injection attack if at least one database query is unauthorized based on the correlated user and session information.

21. The method of claim 20, wherein the correlated user, session, URI, success/failure flag, and context information is used to determine at least one of: (i) whether the captured web request matches a valid web request in a table and (ii) whether each captured database query matches a valid database query.

22. The method of claim 21, wherein the correlating determines a user that generated the captured web request that triggered a respective database query.

23. The method of claim 1, wherein declaring the injection attack further comprises performing at least one remediation action including terminating a respective web session and informing security operations personnel, wherein the remediation action is carried out automatically or by an asynchronous operation triggered by the security operations personnel.

24. A system comprising:
an analysis engine configured to:
capture a web request for a web application and one or more database queries triggered in response to the web request during runtime,
check if the captured web request matches a valid web request in a table mapping valid web requests for the web application to one or more valid database queries for each web request,
if the captured web request matches a valid web request, check in the table if each captured database query triggered in response to the web request matches a valid database query mapped to the valid web request in the table, and
communicate attack status if at least one captured database query does not match a valid database query mapped to the valid web request; and
a validation engine communicatively coupled to the analysis engine, the validation engine configured to:
declare an injection attack in response to receiving the attack status.

25. The system of claim 24 further comprising an instrumentation engine coupled to the analysis engine for forming the table, the instrumentation engine configured to:
extract one or more methods contained in a directory structure for the web application, for each given method of the extracted one or more methods:
identify valid data types for one or more expression parameters of the given method; and
form one or more valid web requests from the given method, wherein each valid web request is formed with a different permutation of the valid data types for the one or more expression parameters of the given method.

26. The system of claim 25, wherein the instrumentation engine is configured to, for each given web request of the one or more valid web requests:
simulate the given web request to capture one or more database queries triggered in response to the given web request; and
store in the formed table, the given web request mapped to the one or more captured database queries triggered in response to the given web request.

27. The system of claim 25, wherein the instrumentation engine is configured to, for each given web request of the one or more valid web requests:
disassemble one or more files of the directory structure that process the given web request;
parse the disassembled files to determine each database query triggered in response to the given web request; and
store in the formed table, the given web request mapped to the determined database queries triggered in response to the given web request.

28. The system of claim 27, wherein the instrumentation engine is configured to use dynamic fuzzy techniques to extract relationships between an URI and corresponding database queries to store in the formed table.

29. The system of claim 25, wherein extracting is performed by at least one of a crawler application or static code analysis.

30. The system of claim 25, wherein the directory structure contains one or more files of at least one of scripting language: NET, PHP, HTML, CGI, Fast CGI, Python, Ruby, or Java.

31. The system of claim 24, wherein the table is formed at load time or runtime.

32. The system of claim 24, wherein prior to sending the attack status, the analysis engine is further configured to confirm that the at least one captured database query is an invalid database query.

33. The system of claim 32, wherein:
the analysis engine is further configured to:
check expression parameters contained in the captured web request; and
the validation engine is further configured to:
declare the injection attack if at least one checked expression parameter contains: (i) data of an incorrect data type or (ii) a database expression or keyword.

34. The system of claim 32, wherein:
the analysis engine is further configured to:
check at least one of length or format of at least one section of the captured web request; and
the validation engine is further configured to:
declare the injection attack if the checked at least one of length or format is incorrect for the at least one section.

35. The system of claim 32, wherein:
the analysis engine is further configured to:
check number of expressions in the at least one captured database query; and
the validation engine is further configured to:
declare the injection attack if the checked number of expressions is incorrect for the at least one captured database query.

36. The system of claim 32, wherein:
the analysis engine is further configured to:
    check structure of the at least one captured database query; and
the validation engine is further configured to:
    declare the injection attack if the checked structure is invalid for the at least one captured database query.

37. The system of claim 32, wherein:
the analysis engine is further configured to:
    check output of the at least one captured database query; and
the validation engine is further configured to:
    declare the injection attack if the output is invalid for the at least one captured database query.

38. The system of claim 32, wherein the analysis engine is further configured to:
    if the at least one captured database query is determined to be a valid database query, add the at least one captured database query mapped to the valid web request in the table.

39. The system of claim 24, further comprising an instrumentation engine coupled to the analysis engine wherein the instrumentation engine is configured to:
    if the captured web request does not match a valid web request, determine if the web request represents a valid web request for the web application by comparing the web request to one or more methods contained in a directory structure for the web application;
    if the web request is a valid web request, simulate the web request to capture one or more database queries triggered in response to the web request; and
    store in the table, the web request mapped to the one or more captured database queries.

40. The system of claim 24, wherein the web request is an URL query.

41. The system of claim 24, wherein the database query is a SQL query and the injection attack is a SQL injection attack.

42. The system of claim 24, wherein capturing is performed by instrumenting instructions in the web application at load time.

43. The system of claim 24, wherein:
the analysis engine is further configured to:
    capture database information from a database server;
    extract database query information for one or more database queries from the database information at an application server;
    insert the extracted database query information from the application server into context data sent to one or more threads of a web server; and
    correlate, at the web server, user, session, URI, success/failure flag, and context information to the database query information in the context data; and
the validation is engine further configured to:
    declare the injection attack if at least one database query is unauthorized based on the correlated user and session information.

44. The system of claim 43, wherein the correlated user, session, URI, success/failure flag, and context information is used by the analysis engine to further determine at least one of: (i) whether the captured web request matches a valid web request in a table and (ii) whether each captured database query matches a valid database query.

45. The system of claim 43, wherein the correlating determines a user that generated the captured web request that triggered a respective database query.

46. The system of claim 24, wherein to declare the injection attack, the validation engine is further configured to perform at least one remediation action including terminating a respective web session and informing security operations personnel, wherein the remediation action is carried out automatically by the validation engine or by an asynchronous operation triggered by the security operations personnel.

* * * * *